United States Patent [19]
Tomofuji et al.

[11] Patent Number: 5,383,046
[45] Date of Patent: Jan. 17, 1995

[54] SUPERVISORY AND CONTROL SIGNAL TRANSMITTING SYSTEM FOR USE IN OPTICALLY AMPLIFYING REPEATERS SYSTEM

[75] Inventors: Hiroaki Tomofuji; Akihiko Sugata; Hiroshi Nishimoto, all of Kawasaki, Japan

[73] Assignee: Fujitsu Limited, Kawasaki, Japan

[21] Appl. No.: 74,021

[22] Filed: Jun. 1, 1993

[30] Foreign Application Priority Data

May 29, 1992 [JP] Japan .................................. 4-139126
Jun. 4, 1992 [JP] Japan .................................. 4-144092

[51] Int. Cl.$^6$ ............................................ H04B 10/02
[52] U.S. Cl. .................................. 359/176; 359/179; 359/110
[58] Field of Search ............... 359/110, 143, 153, 161, 359/174, 176–177, 160, 179; 375/3; 370/13.1; 455/10

[56] References Cited

U.S. PATENT DOCUMENTS

| | | | |
|---|---|---|---|
| 4,300,239 | 11/1981 | Wakabayashi et al. | 359/110 |
| 4,887,309 | 12/1989 | Anderson et al. | 359/110 |
| 5,260,819 | 11/1993 | Hadjifotiou et al. | 359/110 |

FOREIGN PATENT DOCUMENTS 0415438  3/1991  European Pat. Off. ............ 359/174

Primary Examiner—Richard E. Chilcot, Jr.
Assistant Examiner—Kinfe-Michael Negash

[57] ABSTRACT

A supervisory and control signal transmitting system for use in an optically amplifying repeater system amplifies attenuated light and for transmitting data over a long distance between a transmitting station and a receiving station through a plurality of repeaters. The supervisory and control signal transmitting system comprises a sub signal superimposing portion for superimposing both a sub signal with a carrier frequency modulated by a supervisory and control signal and a modulation factor stabilizing signal with a different frequency thereof on an optical main signal modulated corresponding to transmission data, a transmitter sub signal superimposing portion for monitoring the output of the sub signal superimposing portion and for controlling the sub signal superimposing portion so as to stabilize the modulation factor of the sub signal to be superimposed, a modulating portion for receiving the output of the transmitter sub signal superimposing portion, and a stabilizing signal erasing portion for monitoring the output of the modulating portion, for extracting the frequency component of the modulation factor stabilizing signal, and for driving the modulating portion so as to erase the stabilizing signal from the output of the modulating portion.

24 Claims, 35 Drawing Sheets

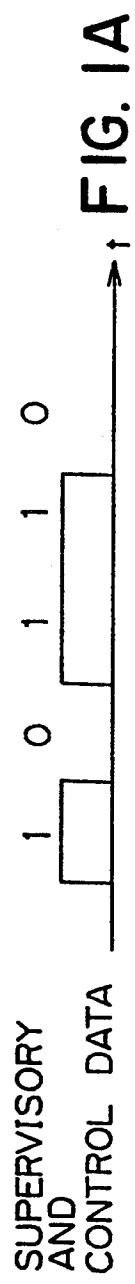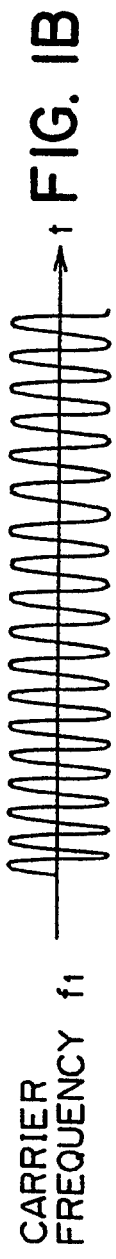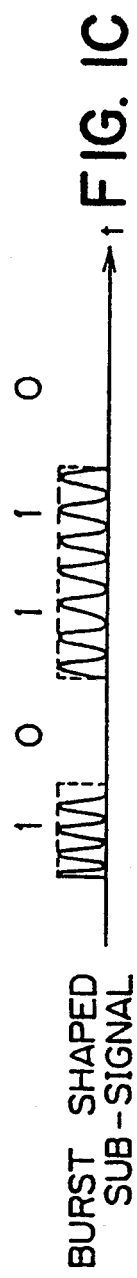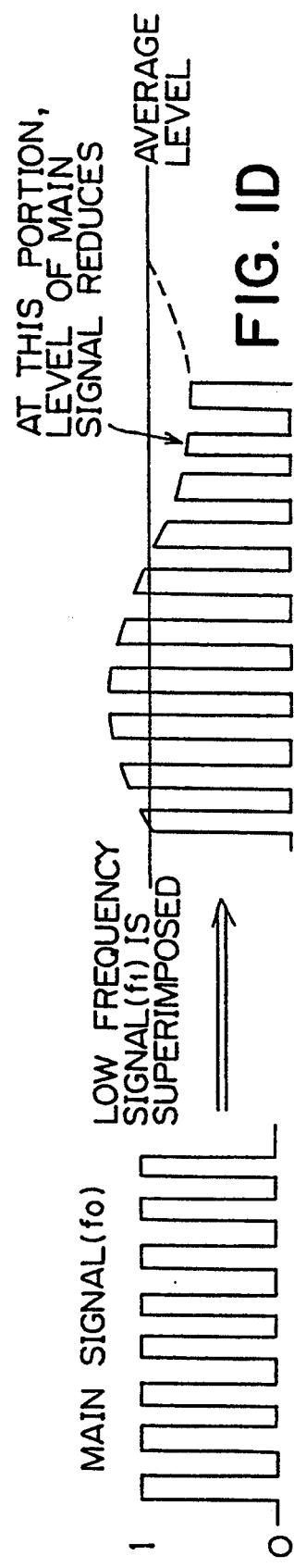

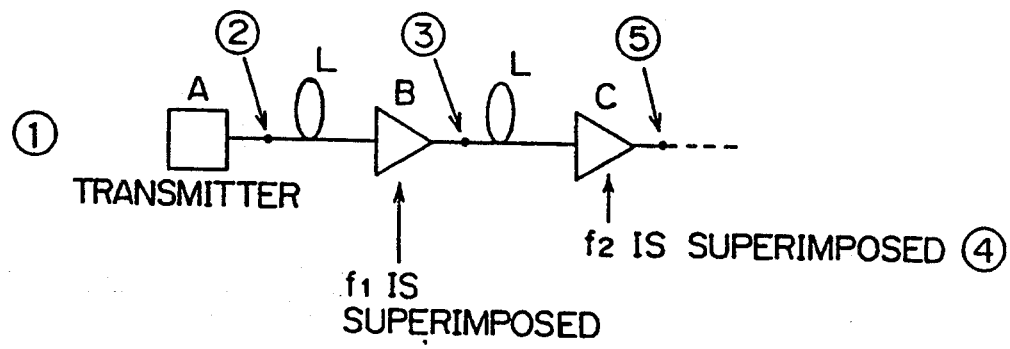
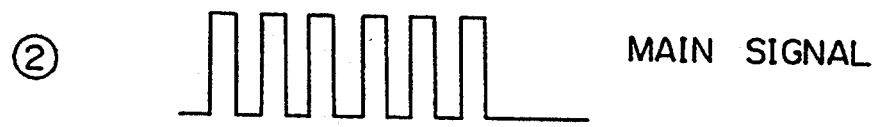
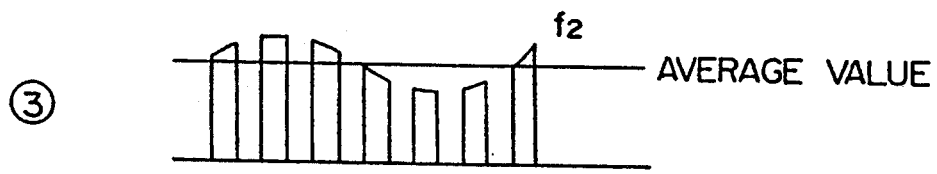
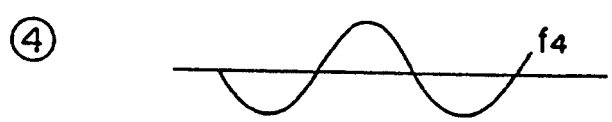
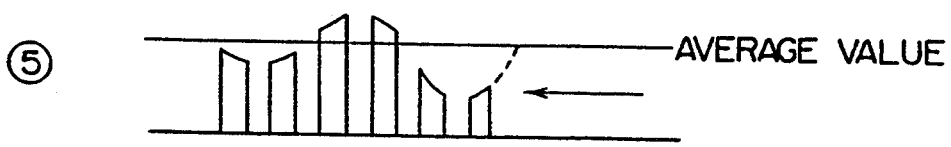
Fig. 2

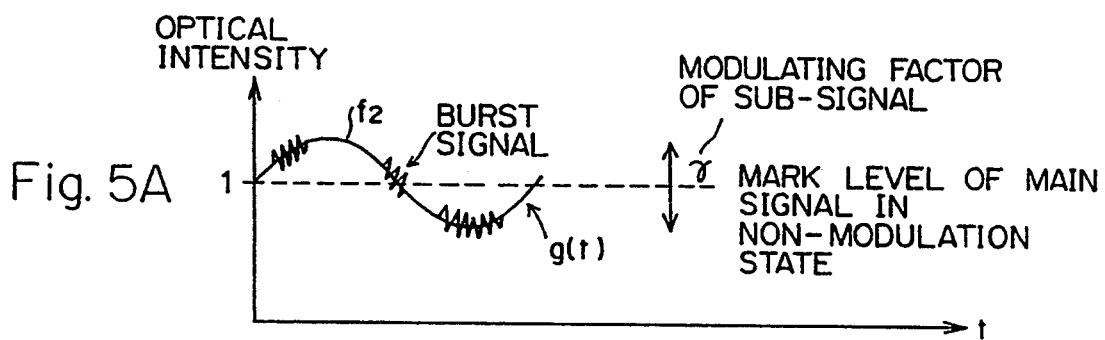
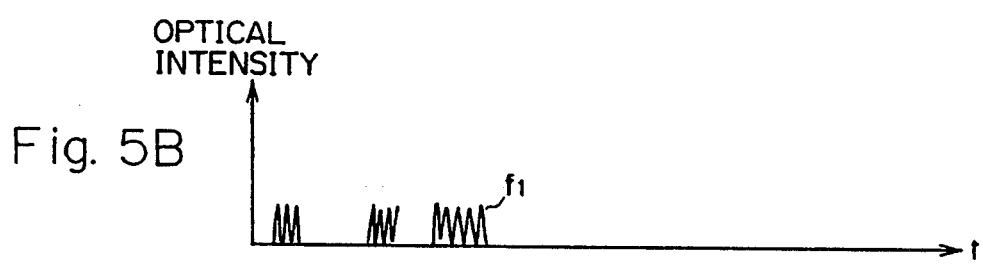
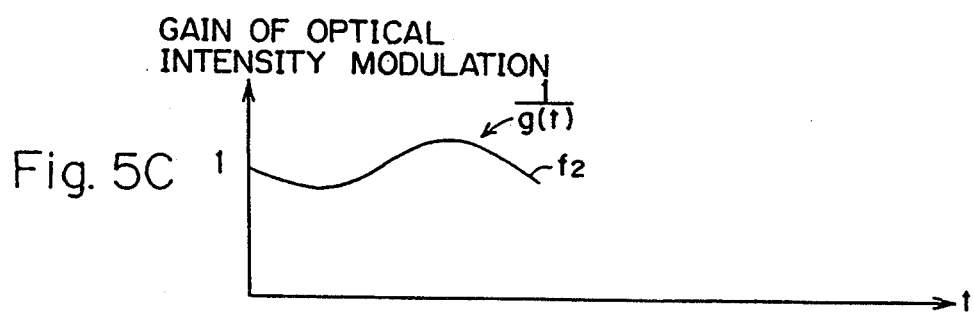
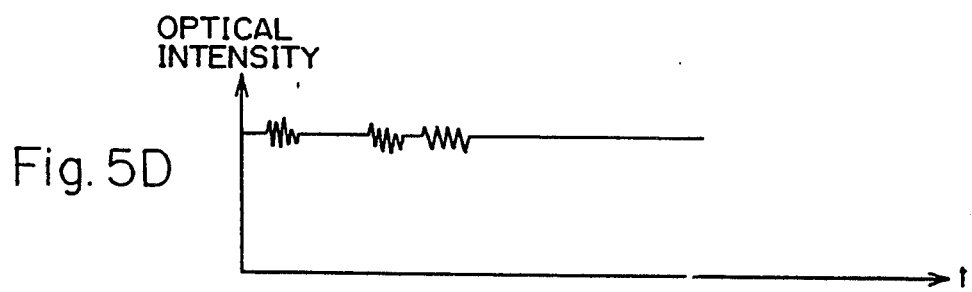

SUPERVISORY AND CONTROL SIGNAL TRANSMITTING SYSTEM FOR USE IN OPTICALLY AMPLIFYING REPEATERS SYSTEM

BACKGROUND OF THE INVENTION

1. Field of the Invention

The present invention relates to an optical communication system, and in particular, to a supervisory and control signal transmitting system for use in a system employing optically amplifying repeaters for amplifying attenuated light and transmitting data over a long distance between a transmitting station and a receiving station.

2. Description of the Related Art

Conventionally, when a long-distance optical communication is made through a conventional cable or a submarine cable, an optical signal is converted into an electrical signal by a repeater so as to amplify the electrical signal. Thereafter, the amplified electrical signal is restored to an optical signal. In recent years, optical communication systems according to non-regenerating relay method using optical amplifiers have been developed. The applications of the optical communication systems to submarine optical communication systems have been studied. In the submarine optical communication systems, supervisory and control information of optical amplifiers should be transmitted between an end station and an optical repeater.

In the optical communication systems, supervisory signals for supervising the operational status of repeaters and so forth (signals which represent operational status of units) and signals for controlling status (such as switching an operating unit to a backup unit upon occurrence of a defect, setting a loop-back path, and so forth) should be transmissible through a line which is in operation. According to one of the methods which have been studied, a sub-signal such as a supervisory and control signal is amplitude-modulated to a main signal by several percent so as to transmit supervisory and control information between an end station and a repeater.

In conventional optical communication systems, optical signals are transmitted between two ground stations through an optical cable. Between these stations, repeaters are disposed at predetermined intervals. The repeaters amplify attenuated optical signals, receive control signals (commands) from the ground stations, control the status of units, and transmit supervisory signals (messages) which represent the status of the units to the ground stations according to the control signals. Such supervisory and control signals are burst signals which are generated when required, not always.

FIG. 1A to 1D are schematic diagrams for explaining supervisory and control signals.

FIG. 1A shows an original supervisory and control data signal. A sine wave with a carrier frequency of f1 (see FIG. 1B) is amplitude-modulated according to the value "0" or "1" of each bit constructing the data signal. Thus, a burst shaped sub-signal is generated. When the value of bit is "0", the amplitude of the burst signal is "0" (off). When the value of bit is "1", the amplitude of the burst signal becomes constant (on). The sub-signal containing the supervisory and control signal is superimposed on the main signal (data signal transmitted between ground stations) and transmitted by a transmitting unit or a repeater. FIG. 1D shows a waveform where a conventional main signal is superimposed on a sub-signal.

As shown by the left part of FIG. 1D, the main signal is a broad band signal with very high frequencies (for example, up to 20 GHz) and a fixed amplitude (modulated by transmission data). The broad band main signal is superimposed (amplitude-modulated) with a sub-signal (supervisory and control signal) which contains a carrier with a very low frequency of f1 (for example, of the order of several MHz). Thus, a waveform as shown by the right part of FIG. 1D is generated. In this case, the modulation is performed so that the variation of the amplitude of the main signal by the sub-signal is within several percent of the amplitude of the main signal.

When automatic gain control (AGC) is performed for the supervisory and control signal which is a burst shaped on/off signal so as to stabilize the modulation factor of the main signal, the modulation may not work correctly. In addition, when the AGC raises the gain because of insufficient modulation factor in the signal off state, an oscillation may take place in the signal on state. Thus, the modulation factor is not stable.

A method for solving the problem involved in the transmission of burst shaped signal by an end station and a non-regenerating repeater has been proposed by the applicant of the present invention (as Japanese Patent Application Laid-Open Nos. HEI 3-285378 and HEI 4-8023). In this method, a main signal is amplitude-modulated to sequential waves (referred to as a modulation factor stabilizing signal) with a frequency other than the frequency band of the sub-signal. Thus, the modulation factor of the main signal is stabilized. By controlling the driving amplitude of the other signal with the modulation factor and predetermined drive amplitude, the modulation factor of the output light is stabilized.

When a supervisory and control signal and a modulation factor stabilizing signal are superimposed on a main signal by the above-described method, as shown in FIG. 1D, the optical power of the main signal is lower than that where the modulation is not performed. Thus, the reception sensitivity reduces. In addition, when a signal is relayed by a number of stages of non-regenerating repeaters, the frequency of successive waves should be unique for each repeater. This is because if all the repeaters use the same frequency, they cannot stabilize the modulation factor. Thus, where the lower parts of successive waves which stabilize the modulation factor overlap due to cumulation by each repeater, the optical level of the main signal is considerably reduced, thereby significantly degrading the reception sensitivity.

FIG. 2 ①-⑤ are schematic diagrams for explaining a decrease of the level of the main signal in the proposed method. In the multiple relayed transmission system as shown in FIG. 2 ①, a plurality of non-regenerating optical repeaters B, C, . . . , etc. are connected to a transmitter A through a transmission line L. In this transmission system, it is assumed that a signal which is output from the transmitter A is a main signal on which a lower frequency wave (sub-signal) is not superimposed as shown in FIG. 2 ②. FIG. 2 ③ shows an optical output where successive waves with a frequency of f2 (low frequency) are superimposed (amplitude-modulated) on the main signal in the first non-regenerating repeater B so as to stabilize the modulation factor.

This output is supplied to the second stage non-regenerating optical repeater C. Successive waves with a frequency of f4 (low frequency) shown in FIG. 2 ④ which differs from the frequency f2 of the waves for stabilizing the modulation factor of the first repeater B are superimposed on the signal shown in FIG. 2 ③ by the second stage non-regenerating optical repeater C. Thus, the non-regenerating optical repeater C generates an optical output as shown in FIG. 2 ⑤. In the waveform of the signal shown in FIG. 2 ⑤, at a portion where lower parts of two low frequency waves f2 and f4 are overlapped, the optical level of the main signal is considerably reduced, thereby significantly degrading the reception sensitivity. This problem will further take place whenever a different low frequency wave is superimposed by the third or later stage non-regenerating repeater in the transmission system shown in FIG. 2 ①.

As described above, when successive waves with a frequency which differs from the frequency of a supervisory and control signal are superimposed by a transmitter and a plurality of repeaters so as to stabilize the modulation factor, the minimum amplitude becomes $(1-n \times \Gamma)$ times that of the main signal on which waves are not superimposed, where $\Gamma$ is the modulation factor of successive waves of each repeater; and n is the number of successive waves. For example, when the modulation factor of successive waves of each repeater is 5%, if successive waves are superimposed by 20 repeaters, the modulation factor may become at worst 100%. Thus, multiple-repeater transmission will become difficult.

In the above description, the related art of the transmission method of a supervisory and control signal for use in a non-regenerating repeater system using only optical amplifiers was discussed. In addition, in a long distance communication system, an optically amplifying repeater system which has both optically amplifying repeaters and reproducing repeaters is known. In this system, after an optical signal is relayed by several stages of optically amplifying repeaters, a reproducing repeater which has so-called 3 R reproducing function converts the optical signal into an electrical signal and then amplifies the signal.

In the system which has both the optically amplifying repeaters and the reproducing repeaters, the line switching, investigation of degrade of transmission quality, maintenance work, and so forth will be quickly performed, when a later stage of an end station can detect a defect which takes place in the optically amplifying repeaters.

In a synchronous digital hierarchy (SDH) interface which is used in optical fiber communication networks such as broad band ISDN, an overhead which is transmitted along with a main signal can accord with enhanced maintenance and operation functions (CCITT recommendations G. 707 to G. 709). In the SDH interface, one frame is constructed at intervals of 8 kHz (125 /μ/second).

FIG. 3 shows an example of the construction of an STM-1 frame which is the lowest format of SDH interface. In the figure, reference numerals 1 and 3 are section overheads SOH. Reference numeral 2 is an AU pointer. Reference numeral 4 is a payload in which data is stored.

The first to third lines of the section overhead (SOH 1) shown in FIG. 3 are used for communications between repeaters and between a repeater and an end station. The fifth to ninth lines of the section overhead (SOH 3) are used for a communication between end stations.

The section overhead SOH used for the communications between repeaters and between a repeater and an end station has various areas used for synchronization, error monitor, order wire (on which sound information is placed), defect evaluation (F1 byte), and so forth. The conventional reproducing repeaters have functions for reading and writing data from and to these areas and for generating a signal with the same frame construction as a main signal if the main signal is lost due to a defect. On the other hand, since the optically amplifying repeaters amplify and relay signals without conversions between optical signals and electrical signals, they cannot perform the overhead process as opposed to the reproducing repeaters.

The defect informing methods of the conventional optically amplifying repeaters can be categorized as ① a method where each repeater sends the current operational status to an earlier stage end station or a later stage end station through a loop-back according to a command received from an end station (for detail of this method, refer to document 1), ② a method where a response signal is superimposed on a main signal by finely modulating an exciting LD (for detail of this method, refer to document 2), and ③ a method where a defect is detected by using an exciting light (for detail of this method, refer to document 3).

However, from the view point of reliability of the optically amplifying repeaters which are required to output high power output, it is likely that the reliability of the exciting LD is lower than that of other constitutional parts. Thus, in the conventional method, if the exciting LD becomes defective, the repeater cannot send the related message to later stages of units.

There is also another method where a dedicated light source for a supervisory signal is used (for detail of this method, refer to document 4), However, in the optically amplifying repeater system which has both optically amplifying repeaters and reproducing repeaters, such a problem has not been solved.

The document 1 is "The OS-280M repeater supervisory system", by H. WAKABAYASHI, at. al. The document 2 is "Supervisory and Control Method in Optically Amplifying Relay System (Translated Title)", 1992 Spring Convention, B-944, The Institute of Electronics, Information, and Communication Engineers, Japan. The document 3 is "Supervisory Signal Transmission for Optical Amplifier System", by S. MATSUOKA et. al., 1990 GLOBECOM '90, 903.2. The document 4 is "Study of Supervisory Signal Transmission System for Linear Repeater (Translated Title)", by YAMABAYASHI et. al., B-943, 1992 Spring Convention, The Institute of Electronics, Information, and Communication Engineers, Japan.

Thus, in conventional optically amplifying repeater systems which have both optically amplifying repeaters and reproducing repeaters, since the defect informing system uses a defect informing portion whose reliability is low, a supervisory signal which represents a defect of an optically amplifying repeater is not securely sent to a related end station.

SUMMARY OF THE INVENTION

An object of the present invention is to provide a supervisory and control signal transmission system for reducing deterioration of reception sensitivity due to accumulation of successive wave signals superimposed for stabilizing the modulation factor of a burst shaped supervisory and control signal in an optical communication system using only non-regenerating repeaters and for allowing multiple-repeater long distance communication using non-regenerating optical repeaters.

Another object of the present invention is to provide a supervisory and control signal transmission system for securely sending defect information which takes place in an optically amplifying repeater of an optically amplifying repeater system which has both optically amplifying repeaters and reproducing repeaters to an end station on a later stage.

FIGS. 4 to 7 are block diagrams and schematic diagrams for explaining the theory of first to third embodiments of the present invention which solve the first object. FIG. 4 is a block diagram showing the theoretical construction of a transmitter as the first embodiment of the present invention. FIG. 5A to 5D are schematic diagrams showing the operation of the first embodiment of FIG. 4. FIG. 6 is a block diagram showing the theoretical construction of a non-regenerating optical repeater as the second embodiment of the present invention. FIG. 7 is a block diagram showing the theoretical construction of a non-regenerating optical repeater system as the third embodiment of the present invention.

A feature of the present invention resides in a supervisory and control signal transmitting system for use in an optically amplifying repeater system, for superimposing a sub-signal with a carrier frequency modulated with a supervisory and control signal on an optical main signal modulated according to transmission data and for transmitting the resultant signal, said system comprising sub-signal superimposing portion for superimposing both said sub-signal and a modulation factor stabilizing signal with a frequency different from said carrier frequency on said main signal, a transmitter sub-signal superimposing portion for monitoring the output of said sub-signal superimposing portion and for controlling said sub-signal superimposing portion so as to stabilize the modulation factor of said sub-signal being superimposed, modulating portion for receiving the output of said transmitter sub-signal superimposing portion and a stabilizing signal erasing portion for monitoring the output of said modulating portion, for extracting the frequency component of said modulation factor stabilizing signal, and for driving said modulating portion so as to erase said stabilizing signal from the output of said modulating portion, said stabilizing signal erasing portion being disposed on a transmitter side of said optical main signal.

In FIG. 4, reference numeral 8 is a transmitter sub-signal superimposing portion which superimposes both a sub-signal (burst signal) modulated with a supervisory and control signal and a modulation factor stabilizing signal with a frequency different from the carrier frequency of the supervisory control signal on a main signal. Reference numeral 9 is a stabilizing signal erasing portion which erases the modulation factor stabilizing signal.

In the transmitter sub-signal superimposing portion 8, reference numeral 10 is a laser light generating portion. Reference numeral 11 is a main signal modulating portion which modulates the intensity of laser light with data. Reference numeral 12 is a sub-signal superimposing portion which superimposes both a sub-signal (burst signal where a carrier with a frequency of f1 is modulated with a supervisory and control signal) and a successive signal with a frequency of f2 for stabilizing the modulation factor on a main signal. Reference numeral 13 is an optical monitoring portion which monitors an optical signal received from the sub-signal superimposing portion 12 and generates the corresponding output signal. Reference numeral 14 is a superimposing and stabilizing portion which generates both a sub-signal and a modulation factor stabilizing signal and produces a bias for use in stabilizing the modulation factor. In the stabilizing signal erasing portion 9, reference numeral 16 is a modulating portion. Reference numeral 17 is an optical monitoring portion. Reference numeral 18 is an erasure driving portion.

In FIG. 6, reference numeral 20 is a sub-signal superimposing portion which superimposes both a sub-signal containing a supervisory and control signal transmitted from the repeater and a stabilizing signal on an optical signal being received. Reference numeral 9 is a stabilizing signal erasing portion which erases the stabilizing signal. In the sub-signal superimposing portion 20, reference numeral 12 is a sub-signal superimposing portion. Reference numeral 13 is an optical monitoring portion. Reference numeral 14 is a superimposing and stabilizing portion which generates both a sub-signal and a modulation factor stabilizing signal and produces a bias for use in stabilizing the modulation factor. In the stabilizing signal erasing portion 9, reference numeral 16 is a modulating portion. Reference numeral 17 is an optical monitoring portion. Reference numerals 18 is an erasure driving portion.

In FIG. 7, reference numeral 21 is a first non-regenerating optical repeater which superimposes a sub-signal (f3) (burst signal for a supervisory and control signal) and a modulation factor stabilizing signal (f4) and erases signals with other frequencies. Reference numeral 22 is a transmission line. Reference numeral 23 is a second non-regenerating optical repeater which has the same construction as the first non-regenerating optical repeater 21 except that the frequency of the sub-signal is f1, the frequency of the modulation factor stabilizing signal is f2, and the frequency of the signal to be erased is f4, which is the frequency of the modulation factor stabilizing signal of the first non-regenerating optical repeater 21.

In the present invention, to accomplish the above-described first object, when a modulation factor stabilizing signal which is superimposed for stabilizing the modulation factor of a burst shaped supervisory and control signal is transmitted and relayed, before the stabilizing signal is accumulated, it is erased.

FIG. 8 is a block diagram showing the basic construction of the fourth embodiment which accomplishes the second object. In the figure, an optically amplifying repeater 25 and a reproducing repeater are disclosed between a transmitting station and a receiving station of a communication system. For example, both types of repeaters are disposed in such a way that the number of stages of the optically amplifying repeaters 25 is 10 or more and the reproducing repeater 26 is disposed at intervals of three successive optically amplifying repeaters 25. In other words, three successive optically amplifying repeaters 25 are followed by one reproducing repeater 26, followed by three successive optically amplifying repeaters 25, and so forth.

In the optically amplifying repeater 25, reference numeral 27 is a defect detecting portion which detects a defect which takes place in the optically amplifying repeater 25. Reference numeral 28 is, for example, a dedicated supervisory light source which generates a supervisory signal for sending defect information. In the reproducing repeater 26, reference numeral 29 is a supervisory signal placing portion which receives a supervisory signal sent from the optically amplifying repeater 25 which detects a defect and places the defect information of the supervisory signal in the main signal, for example, in the section overhead of the frame shown in FIG. 3.

FIG. 5A to 5D are schematic diagrams for explaining the operation of the first embodiment shown in FIG. 4. In the transmitter sub-signal superimposing portion 8, the main signal modulating portion 11 modulates the intensity of DC light of the laser light generating portion 10 with a main signal. The resultant signal is sent to the sub-signal superimposing portion 12.

The sub-signal superimposing portion 12 superimposes (modulates) both a sub-signal (supervisory and control signal) supplied from the superimposing and stabilizing portion 14 and a modulation factor stabilizing signal on an optical signal having a main signal. The optical output supplied from the sub-signal superimposing portion. 12 is monitored by the optical monitoring portion 13. The monitor output according to the optical output is fed back to the superimposing and stabilizing portion 14. Thus, the superimposing and stabilizing portion 14 controls the sub-signal superimposing portion 12 so as to stabilize the modulation factor of the output light with the predetermined modulation factor and the driving amplitude.

FIG. 5A shows an envelope of an optical signal which is output from the transmitter sub-signal superimposing portion 8 (the vertical axis represents intensity of light, whereas the horizontal axis represents time). The dotted line where the intensity of light is "1" represents a mark level in which the main signal is not modulated. Over the main signal with the mark level, as shown in FIG. 5B, a burst signal with a carrier frequency of f1 (sub-signal which is supervisory and control signal) and a modulation factor stabilizing signal with a frequency of f2 (having a gain of g (t)) are superimposed. The modulation factor of the sub-signal which is set against the main signal is r. In the example shown in FIG. 5, the frequency f1 is much larger than the frequency f2. However, the necessary condition is that the frequency f1 differs from the frequency f2.

The optical output of the transmitter sub-signal superimposing portion 8 is sent to the stabilizing signal erasing portion 9. The modulating portion 16 of the stabilizing signal erasing portion 9 optically modulates the output of the erasure driving portion 18. The modulated output is detected by the optical monitoring portion 17. The earlier staged transmitter sub-signal superimposing portion 8 gets the signal component (with a frequency of f2) which is superimposed by the transmitter sub-signal superimposing portion 8 and supplies this signal component to the erasure driving portion 18. At this point, a signal with its waveform being the inverse of the stabilizing signal component, (1/ g (t)), is generated as shown in FIG. 5C so as to drive the modulating portion 16. In other words, the modulated signal is inversely modulated against the modulation of the earlier stage. Thus, as shown in FIG. 5D, the modulating portion 16 only outputs the burst shaped superimposed signal to the transmission line.

In the theoretical construction of the non-regenerating optical repeater 8 shown in FIG. 6, the construction of tile sub-signal superimposing portion 20 is the same as that of the transmitter sub-signal superimposing portion 8 of FIG. 4 except that the laser light generating portion 10 and the main signal modulating portion 11 are not provided. In other words, in the sub-signal superimposing portion 20, the sub-signal superimposing portion 12 superimposes both a sub-signal with a carrier frequency f1 (burst signal) to be transmitted from this repeater and the modulation factor stabilizing signal with a frequency f2 on an optical signal received from the transmission line. The output is monitored by the optical monitoring portion on 13 and then fed back to the superimposing and stabilizing portion 14. Thus, the sub-signal superimposing portion 20 outputs the same signal shown in FIG. 5A. This output is sent to the stabilizing signal erasing portion 9 with the same construction as the stabilizing signal erasing portion 9 shown in FIG. 4. Thus, the stabilizing signal (frequency f2) superimposed by the sub-signal superimposing portion 20 on the earlier stage is erased. As a result, the output as shown in FIG. 5D is sent to the transmission line.

In the theoretical construction of the non-regenerating optical repeater system shown in FIG. 7, the construction of the first non-regenerating optical repeater 21 is the same as that of the second non-regenerating optical repeater 23. These non-regenerating optical repeaters respectively have a modulator or an amplifier with a modulation function. The difference between the first and second non-regenerating optical repeaters 21 and 23 is that the sub-signal superimposing portion and the stabilizing signal erasing portion do not have a modulator (superimposing portion) or an amplifier as with the repeater shown in FIG. 6.

The first non-regenerating optical repeater 21 superimposes (modulates) both a sub-signal (burst signal) with a carrier frequency f3 and a stabilizing signal of successive waves with a frequency f4 on a main signal received from the transmission line. In this modulation, the modulation factor is stabilized. In addition, the stabilizing signal which is used in the non-regenerating optical repeater on the earlier stage of the non-regenerating optical repeater 21 is erased. Thus, the output light is sent to the transmission line 22.

The non-regenerating optical repeater 23 superimposes both a burst signal with a carrier frequency of f1 and a modulation factor stabilizing signal of successive waves with a frequency f2 on the signal light received from the transmission line 22. In addition, the non-regenerating optical repeater 23 performs the modulation so that the stabilizing signal with the frequency f4 generated in the first non-regenerating repeater 21 on the earlier stage of the non-regenerating optical repeater 23 is erased. In this case, the necessary condition is that frequency f4 differs from the frequency f2. In addition, the frequencies f4 and f2 should be outside the band of the carrier frequencies f1 and f3.

In the fourth embodiment which accomplishes the second object, as shown in FIG. 8, the defect detecting portion 27 of the optically amplifying repeater 25 in which a defect takes place detects the defect. The optically amplifying repeater 25 sends a supervisory signal to a reproducing repeater 26 on a later stage through other optically amplifying repeaters 25. In other words, optically amplifying repeaters 25 on the later stages optically amplify the supervisory signal and transmit the signal to a reproducing repeater 26 on a later stage as with for example the main signal.

The supervisory signal is optically amplified and transmitted to the reproducing repeater 26. Defect information of the supervisory signal is written to the section overhead of the main signal. Thereafter, the supervisory signal as part of the main signal is stably transmitted to the receiving station.

These and other objects, features and advantages of the present invention will become more apparent in light of the following detailed description of a best mode embodiment thereof, as illustrated in the accompanying drawings.

BRIEF DESCRIPTION OF DRAWINGS

One skilled in the art can easily understand additional features and objects of this invention from the description of the preferred embodiments and some of the attached drawings. In the drawings;

FIG. 1A to 1D are schematic diagrams for explaining a waveform of a supervisory and control signal;

FIGS. 2 ①-2 ⑤ are a schematic diagrams for explaining a decrease of the level of a main signal in related art;

FIG. 5A to 5D are schematic diagrams for explaining the operation of the first embodiment of FIG. 4;

FIG. 36 is a block diagram showing the detailed construction of a reception determining circuit.

DESCRIPTION OF PREFERRED EMBODIMENTS

Figure 3:
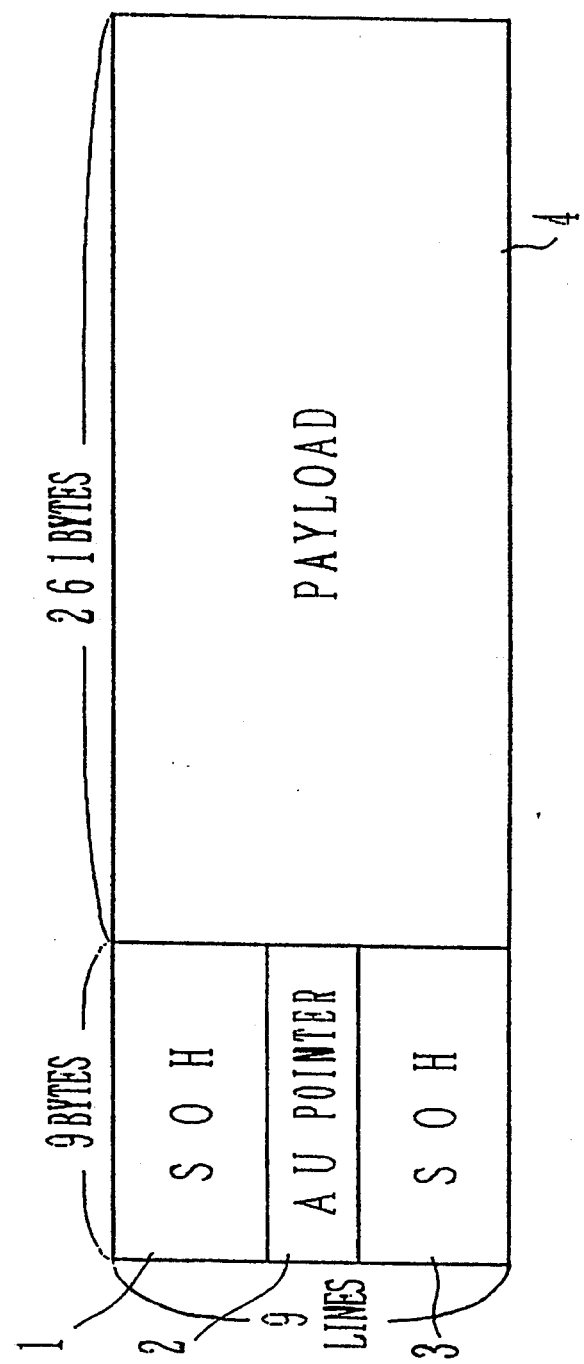
FIG. 3 is a schematic diagram showing the construction of an STM-1 frame.
Figure 4:
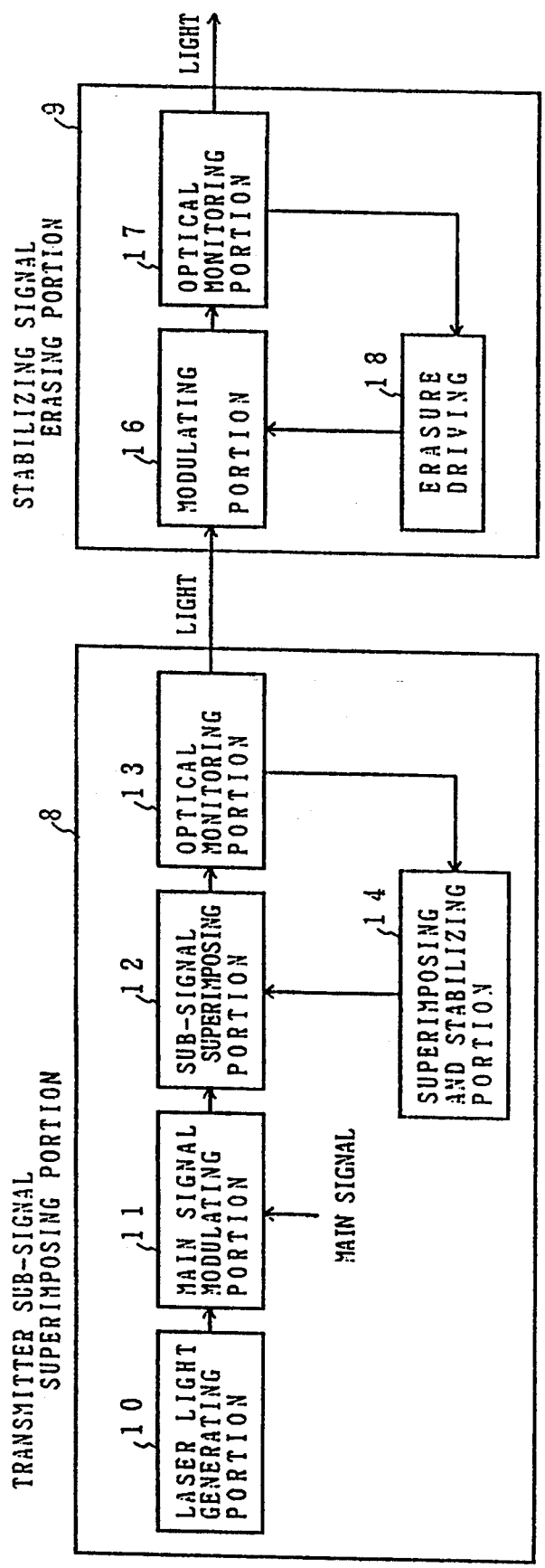
FIG. 4 is a block diagram showing the theoretical construction of a transmitter as a first embodiment of the present invention.
Figure 6:
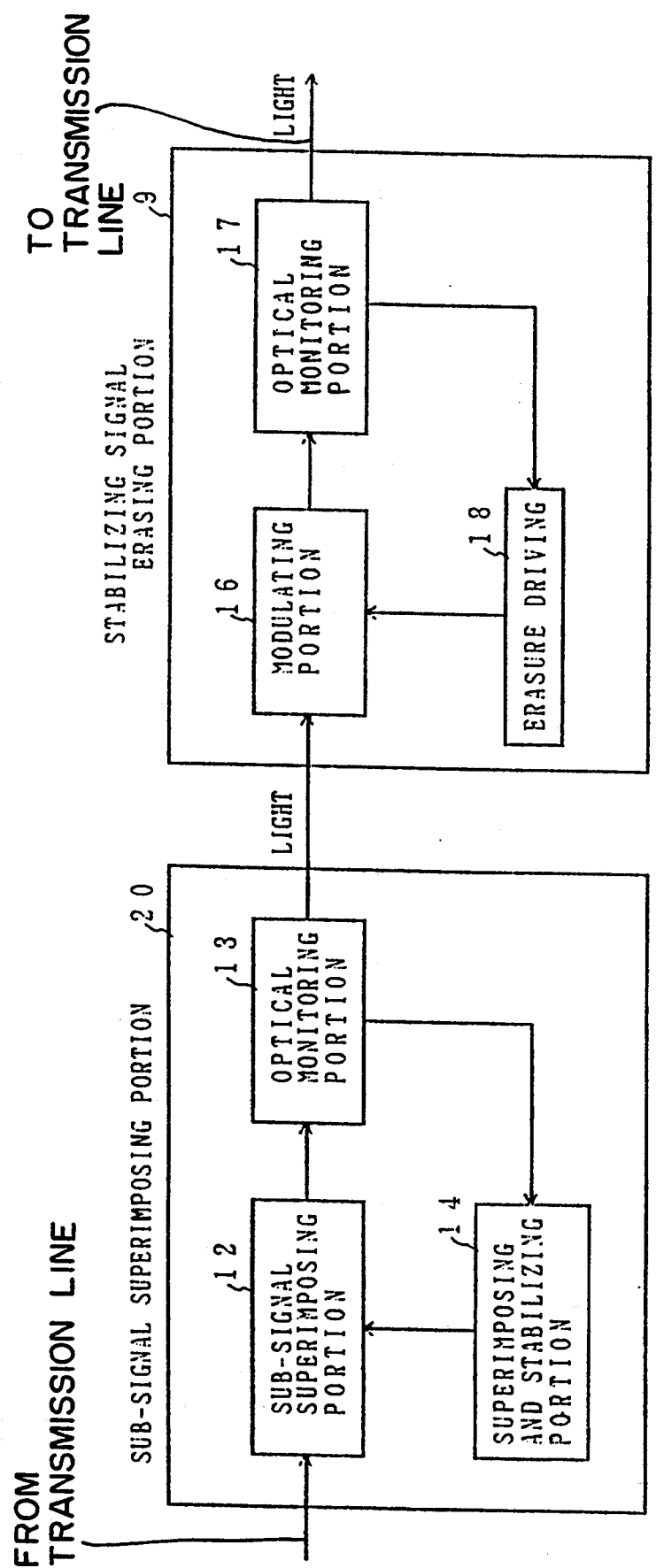
FIG. 6 is a block diagram showing the theoretical construction of a non-regenerating optical repeater as a second embodiment of the present invention.
Figure 7:
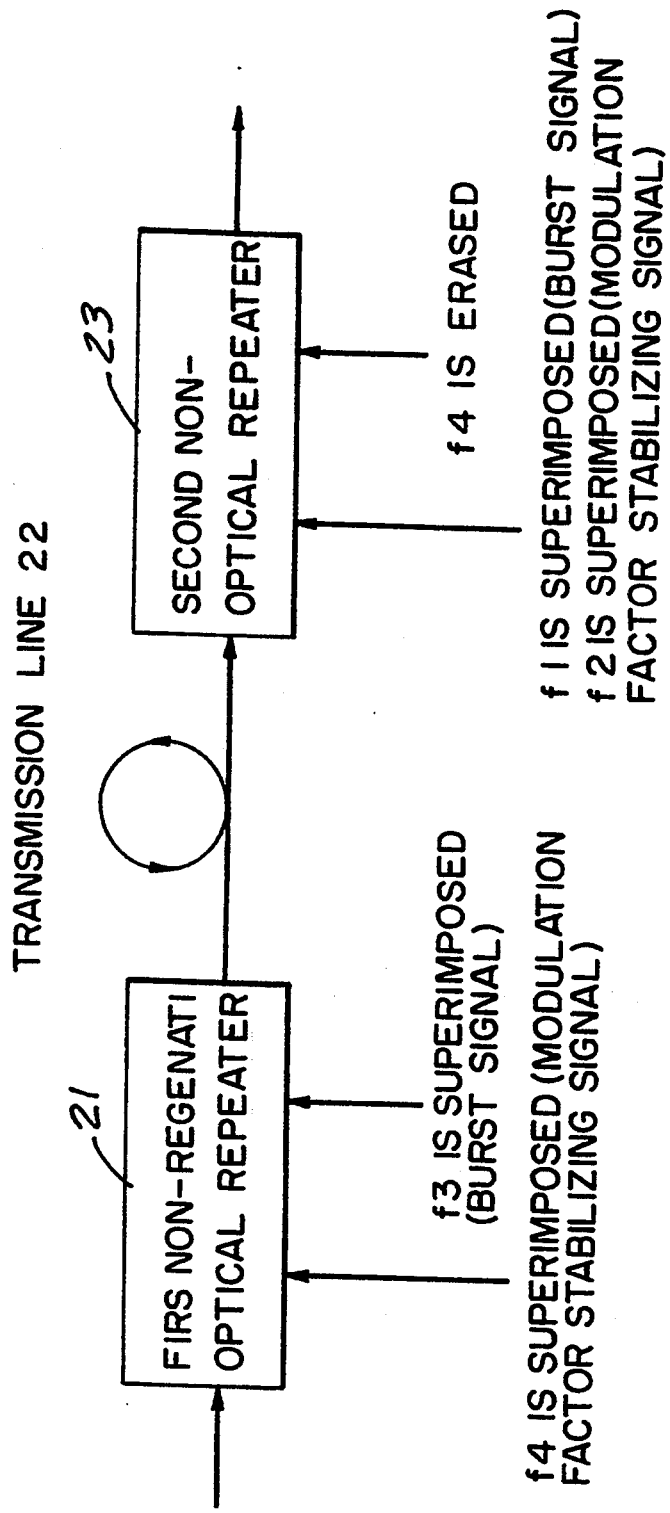
FIG. 7 is a block diagram showing the theoretical construction of an non-reproduction optical repeater system as a third embodiment of the present invention.
Figure 8:
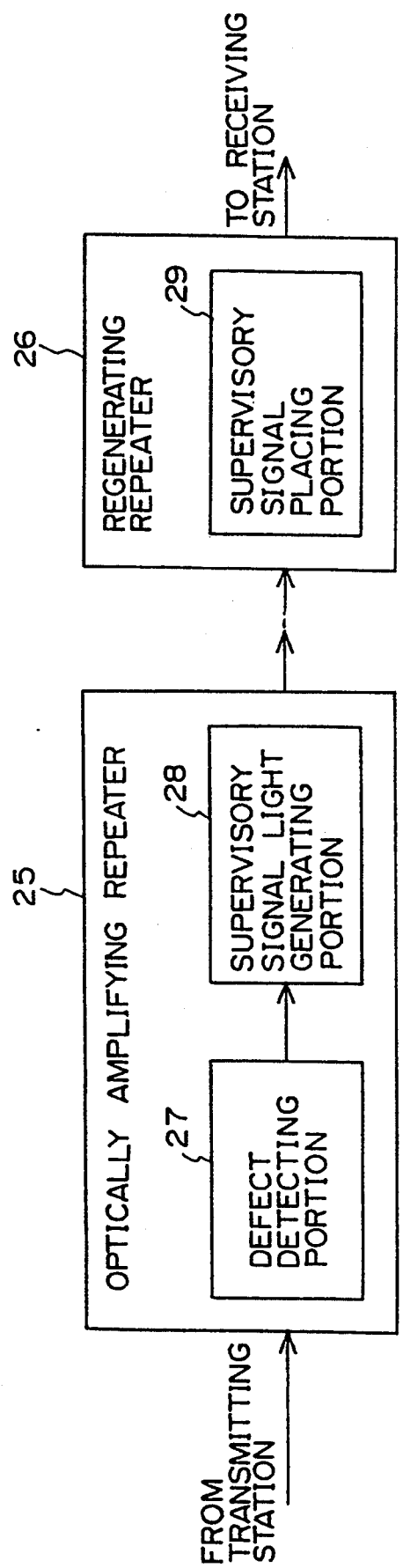
FIG. 8 is a block diagram showing the basic construction of a fourth embodiment of the present invention.
Figure 9:
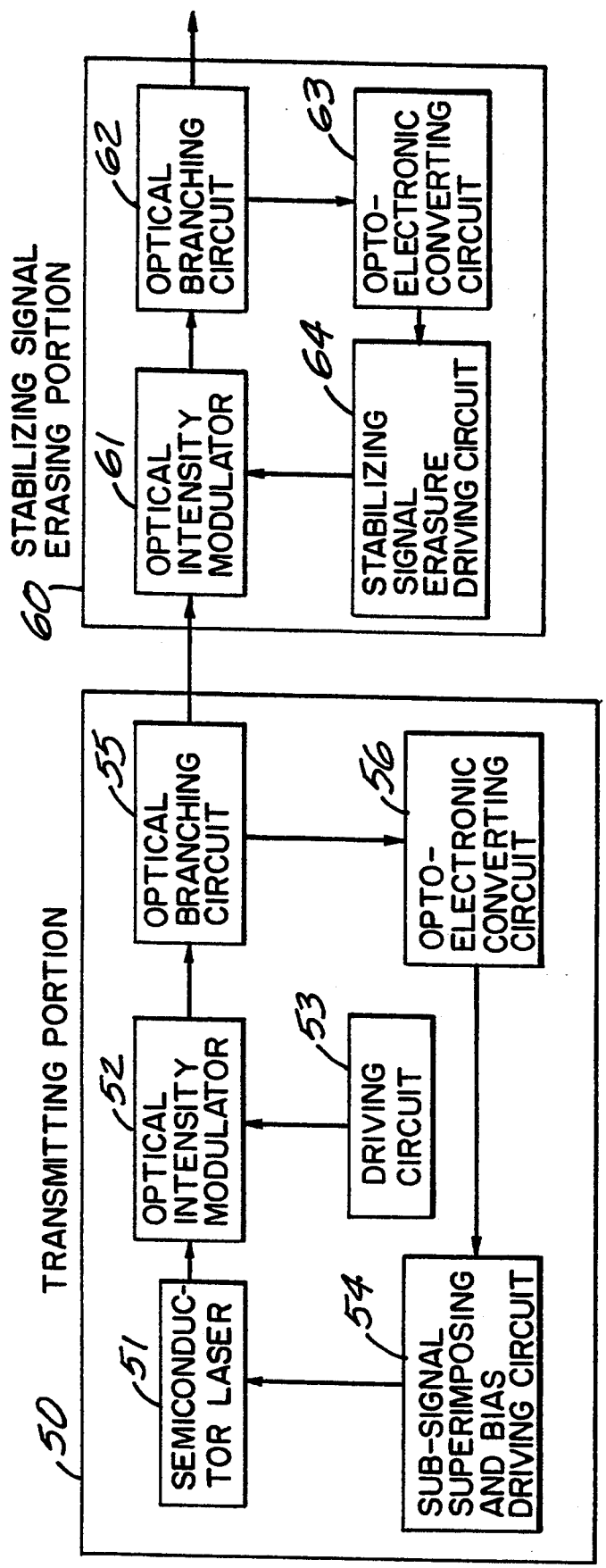
FIG. 9 is a block diagram showing a first example of the construction of a transmitter as the first embodiment.

FIG. 9 is a block diagram showing a first example of the construction of a transmitter as a first embodiment of the present invention. In this construction, a sub-signal is superimposed by a semiconductor laser. In the figure, reference numeral 50 is a transmitting portion. In the transmitting portion 50, reference numeral 51 is a semiconductor laser. Reference numeral 52 is an optical intensity modulator. Reference numeral 53 is a driving circuit which drives the optical intensity modulator 52 with data of the main signal. Reference numeral 54 is a sub-signal superimposing and bias driving circuit. Reference numeral 55 is an optical branching circuit. Reference numeral 56 is an opto-electronic converting circuit. Reference numeral 60 is a stabilizing signal erasing portion. Reference numeral 61 is an optical intensity modulator. Reference numeral 62 is an optical branching circuit. Reference numeral 63 is an opto-electronic converting circuit. Reference numeral 64 is a stabilizing signal erasure driving circuit. The transmitting portion 50 of FIG. 9 accords with transmitter sub-signal superimposing portion 8 of FIG. 4. The stabilizing signal erasing portion 60 of FIG. 9 accords with the stabilizing signal erasing portion 9 of FIG. 4. The optical branching circuits 55 and 62 and the opto-electronic converting circuits 56 and 63 of FIG. 9 accord with the optical monitoring portion 13 and 17 of FIG. 4.

In the first example of the construction of the transmitter shown in FIG. 9, the bias current of the semiconductor laser 51 is controlled with the sub-signal and modulation factor stabilizing signal received from the sub-signal superimposing and bias driving circuit 54. Thus, the laser output is varied and thereby the sub-signal (burst signal with the frequency of f1 modulated with the supervisory and control signal) and the modulation factor stabilizing signal (successive waves with the frequency of f2) are superimposed.

When the output of the semiconductor laser 51 is sent to the optical intensity modulator 52, the optical transmission is controlled with a voltage which represents the main signal received from the driving circuit 53, thereby the amplitude is controlled. Thus, the modulation is performed. The optical branching circuit 55 branches most of the output light to the stabilizing signal erasing portion 60. Part of the output light is branched to the opto-electronic converting circuit 56. The opto-electronic converting circuit 56 converts the optical signal into electrical signal.

Figure 10:
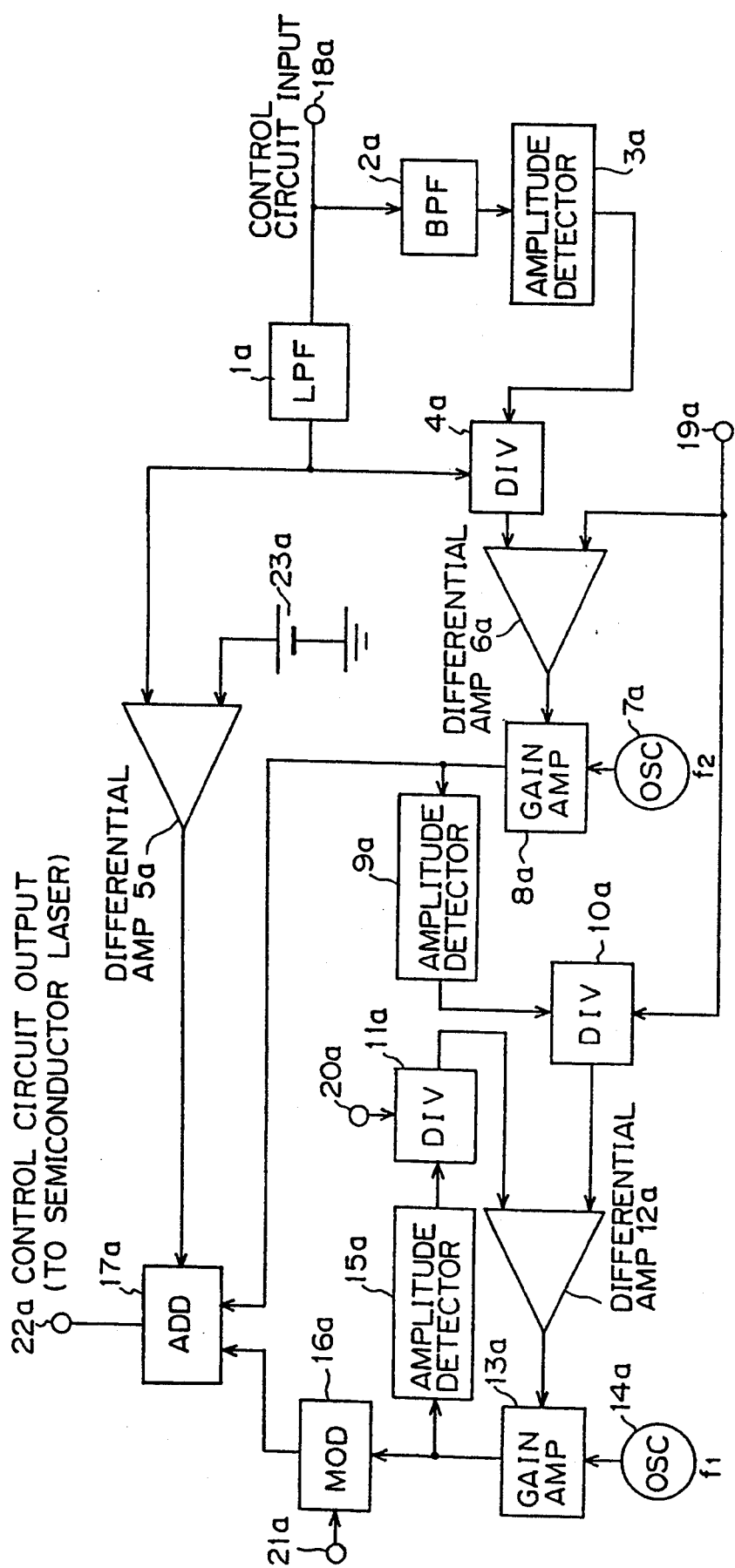
FIG. 10 is a block diagram showing a first example of the construction of a sub-signal superimposing and bias driving circuit.
Figure 11:
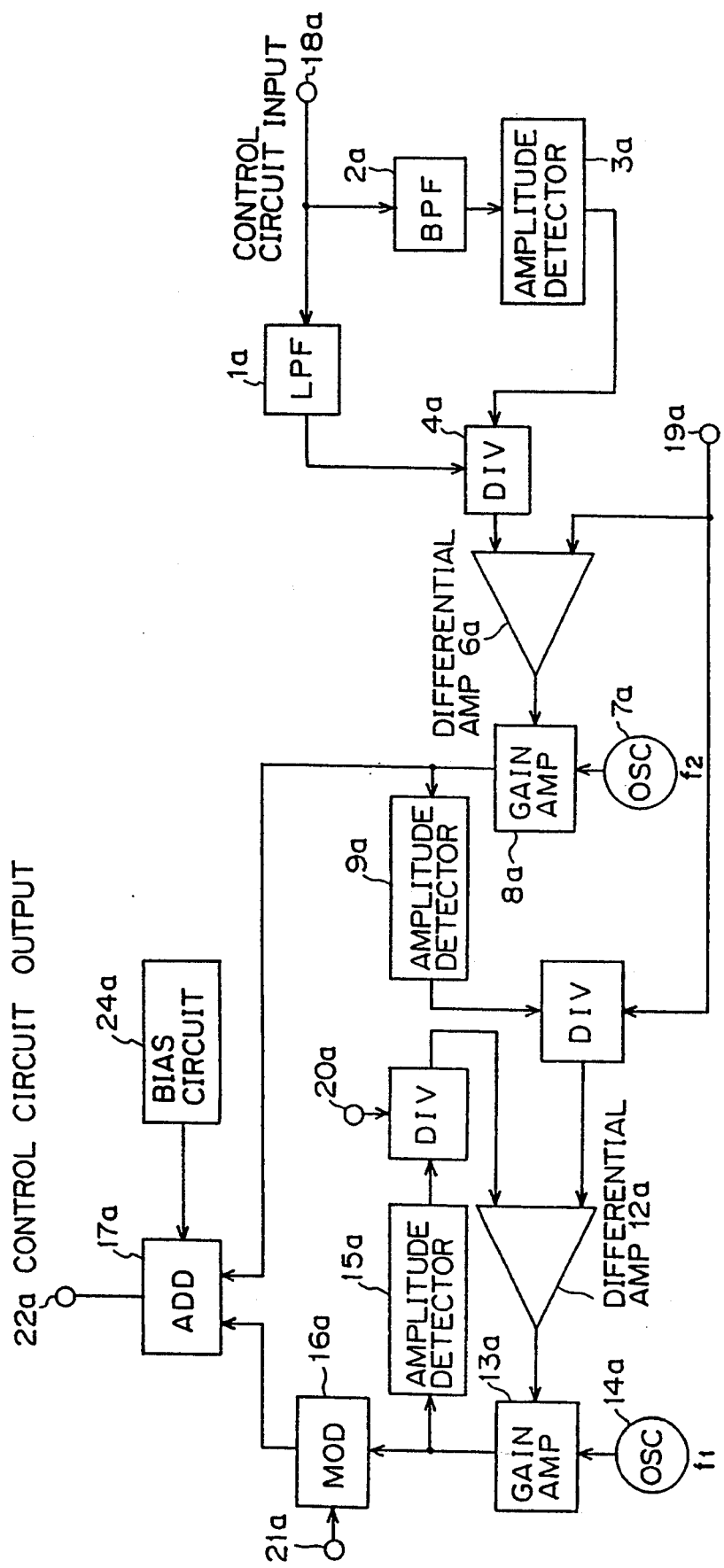
FIG. 11 is a block diagram showing a second example of the construction of the sub-signal superimposing and bias driving circuit.

The sub-signal superimposing and bias driving circuit 54 which has received the signal controls the drive level for superimposing the sub-signal and the stabilizing signal so as to stabilize the modulation factor of the sub-signal. FIGS. 10 and 11 show examples of the construction of the sub-signal superimposing and bias driving circuit 54.

Figure 12A:
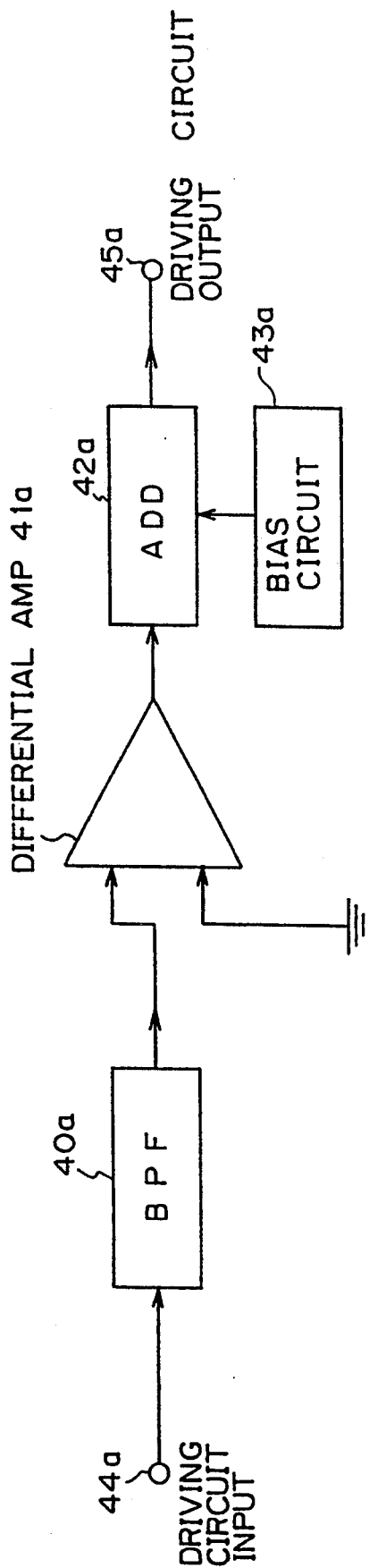
FIG. 12A is a block diagram showing an example of the construction of a stabilizing signal erasure driving circuit.

In the stabilizing signal erasing portion 60, the optical intensity modulator 61 modulates the input light with the output of the stabilizing signal erasure driving circuit 64. The optical branching circuit 62 branches part of the output to the optical monitoring circuit. Most of the output of the optical intensity modulator 61 is sent to the opto-electronic converting circuit 63. The opto-electronic converting circuit 63 converts the optical signal into electrical signal. The stabilizing signal erasure driving circuit 64 generates a drive signal for performing inverse modulation against the gain of the stabilizing signal contained in the electrical signal with the gain control characteristic which is reciprocal thereto. Thus, the optical intensity modulator 61 generates an output with a flat level which does not contain the component of the stabilizing signal. FIG. 12A shows an example of the construction of the stabilizing signal erasure driving circuit 64, which will be described later.

FIG. 10 shows a first example of the construction of the sub-signal superimposing and bias driving circuit. This construction is used when a bias controlling mechanism which keeps the optical output constant by automatic optical output constant control (which is referred to as APC or ALC) such as a semiconductor laser or an optical amplifier is provided. However, this construction is not used when circuits such as an optical intensity modulator which is driven with a voltage and a bias voltage setting circuit which causes the operating point to have linear characteristic should be provided. In other words, since the optical intensity modulator generally has non-linear characteristic, a bias circuit suitable for the characteristic is required. FIG. 11 shows a second example of the construction of the sub-signal superimposing and bias driving circuit. This construction is used when a sub-signal is superimposed by an optical intensity modulator, a semiconductor laser, or an optical amplifier.

Next, the construction of the sub-signal superimposing and bias driving circuit shown in FIG. 10 will be described. In the figure, reference numeral 1a is a low pass filter (LPF) which extracts the DC component. Reference numeral 2a is a band pass filter (BPF) which extracts only the component of frequency f2 (modulation factor stabilizing signal). Reference numerals 3a, 9a, and 15a are amplitude detectors. Reference numerals 4a, 10a, and 11a are dividers (DIV). Reference numerals 5a, 6a, and 12a are differential amplifiers (differential AMP). Reference numeral 7a is an oscillator (OSC) with a frequency of f2. Reference numerals 8a and 13a are gain amplifiers (gain AMP). Reference numeral 14a is an oscillator (OSC) with a frequency of f1. Reference numeral 16a is a modulator (MOD). Reference numeral 17a is an adder (ADD). Reference numeral 18a is a control circuit input (supplied from the opto-electronic converting circuit 56 shown in FIG. 9). Reference numeral 19a is a reference voltage for setting the modulation factor. Reference numeral 20a is a reference voltage for setting the modulation factor with a frequency of f1. Reference numeral 21a is data signal (burst signal of supervisory and control signal) modulated with a carrier with a frequency of f1. Reference numeral 22a is a control circuit output supplied to a semiconductor laser. Reference numeral 23a is a reference voltage for setting the average power of the output light.

When a monitor signal is sent from the opto-electronic converting circuit 56 shown in FIG. 9 to the control circuit input 18a, the low pass filter (LPF) 1a extracts the DC (direct current) component. The differential amplifier 5a generates an output supplied to the adder 17a using the reference voltage 23a. With this output, the adder 17a generates a bias voltage for keeping an output to the semiconductor laser constant. The band pass filter 2a extracts a stabilizing signal with a frequency of f2. The stabilizing signal is sent to the amplitude detecting circuit 3a. The amplitude detecting circuit 3a detects the amplitude of the stabilizing signal and sends the signal to the divider 4a. The divider 4a divides the amplitude of the stabilizing signal by the DC component so as to detect the modulation factor.

The differential amplifier 6a compares the output which represents the modulation factor with the reference voltage 19a for setting the modulation factor of the stabilizing signal (frequency f2). The gain of the gain amplifier 8a to which the stabilizing signal with a frequency of f2 which is supplied from the oscillator 7a, is fed back with the output. Thus, the modulation factor is stabilized. The output of the gain amplifier 8a is supplied to the adder 17a. The amplitude detector 9a detects the amplitude of the stabilizing signal and sends it to the divider 10a.

The gain amplifier 13a adjusts the output which is the supervisory and control signal (burst signal) with a frequency of f1 supplied from the oscillator 14a corresponding to the output of the differential amplifier 12a. This output is supplied to the modulator 16a. The modulator 16a modulates the output with the data signal 21a. The adder 17a adds the output of the modulator 16a and the stabilizing signal supplied from the gain amplifier 8a. The bias of the adder 17a is adjusted by the output of the differential amplifier 5a. The adder 17a sends the resultant output as a control circuit output to the semiconductor laser 51 shown in FIG. 9.

The output of the gain amplifier 13a is detected by the amplitude detector 15a. The divider 11a divides the output of the amplitude detector 15a by the reference voltage for setting the modulation factor wi with a frequency of f1. The divider 11a sends the result to the differential amplifier 12a. The divider 10a divides the amplitude of the stabilizing signal with a frequency of f2 detected by the amplitude deflector 9a by the reference voltage 19a for setting the modulation factor. The signal representing the obtained modulation factor is supplied to the other input of the differential amplifier 12a. The differential amplifier 12a controls the gain of the gain amplifier 13a so that the ratio of the signal component with a frequency of f1 and the signal component with a frequency of f2 becomes a predetermined value.

In the construction of the sub-signal superimposing and bias driving circuit shown in FIG. 11, reference numerals 1a to 4a and 6a to 17a are the same as those shown in FIG. 10. Signals of inputs and outputs denoted by reference numerals 18a to 22a are the same as those shown in FIG. 10. In the construction shown in FIG. 10, the bias of the adder 17a is set by the output of the differential amplifier 5a. On the other hand, in the construction shown in FIG. 11, a bias circuit 2a is provided. When the modulator of the sub-signal uses a semiconductor laser (which is a modulator which modulates by changing the bias current, thereby the output) as with the first example of the construction of the transmitter shown in FIG. 9, it is constructed of a DC bias circuit. When the modulator of the sub-signal uses an optical intensity modulator (which modulates by changing the transmittivity of light) as with another example of the construction (which will be described later), it is constructed of an operating point setting bias circuit.

Figure 12B:
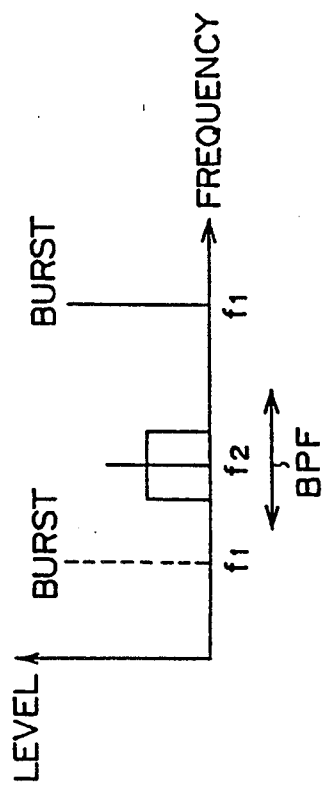
FIG. 12B is a schematic diagram showing a frequency distribution of a stabilizing signal.

FIG. 12A is a block diagram showing the construction of a stabilizing signal erasure driving circuit. FIG. 12B is a schematic diagram showing a frequency distribution of a stabilizing signal.

In FIG. 12A, reference numeral 40a is a band pass filter (BPF) which passes a frequency f2 (stabilizing signal). Reference numeral 41a is a differential amplifier (differential AMP). Reference numeral 42a is an adder (ADD). Reference numeral 43a is a bias circuit. Reference numeral 44a is a driving circuit input of the opto-electronic converting circuit 63 shown in FIG. 9. Reference numeral 45a is a driving circuit output supplied to the optical intensity modulator.

When an optical intensity modulator 61 is used for the modulator of the stabilizing signal erasing portion 60 as with the first example of the construction shown in FIG. 9, the bias circuit 43a is practically constructed of an operating point setting bias circuit as described above. When a semiconductor laser is used, the bias circuit 43a is constructed of a laser DC bias circuit. When an optical amplifier is used, an optical amplifier exciting light source is disposed between the drive circuit output and the optical amplifier.

Next, the operation of the second example of the construction of the transmitter shown in FIG. 12A will be described. The band pass filter 40a extracts a stabilizing signal component with a frequency of f2 received from the opto-electronic converting circuit 63 through the driving circuit input. The signal level is detected by the differential amplifier 41a. The adder 42a acids the detected signal level and the bias received from the bias circuit 43 according to the modulator. The adder 42a supplies the result to the optical intensity modulator 61 through the driving circuit output 45a. The optical intensity modulator 61 erases the stabilizing signal component. The frequency f2 of the stabilizing signal should be outside the band of the frequency f1 of the carrier of another burst signal as shown in FIG. 12B.

Figure 13:
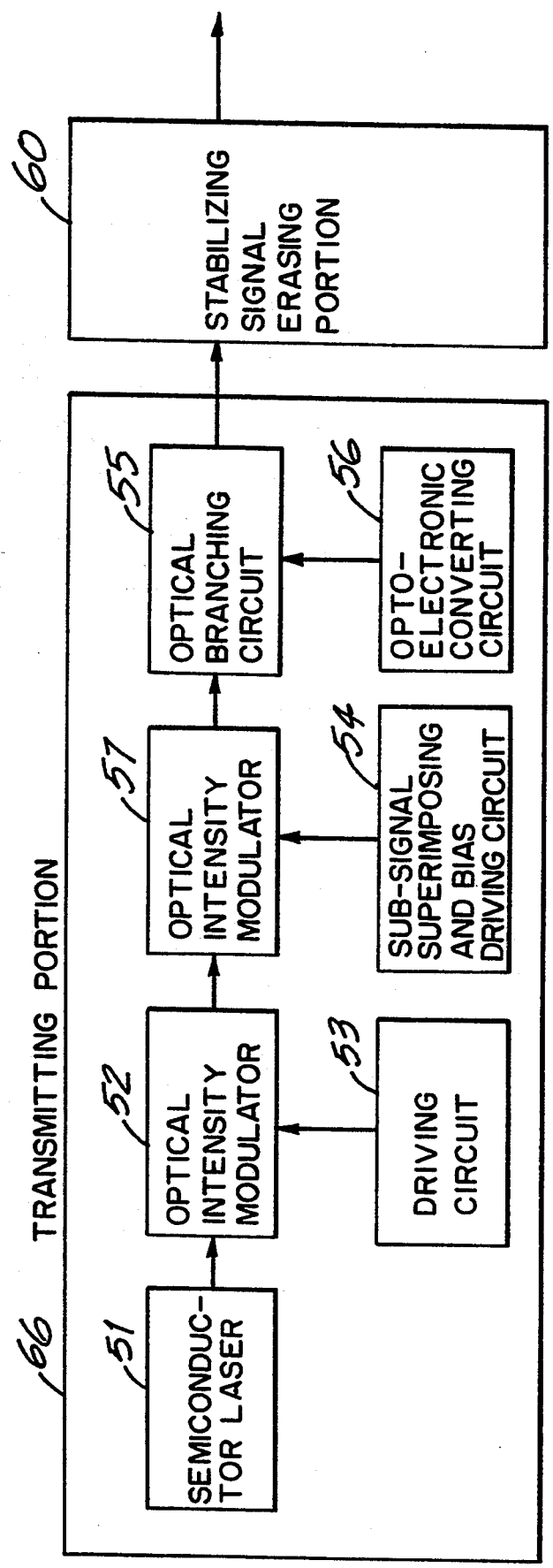
FIG. 13 is a block diagram showing a second example of the construction of the transmitter.

FIG. 13 is a block diagram showing a second example of the construction of the transmitter. Next, this example will be described.

In this example, a sub-signal is superimposed by an optical intensity modulator or an optical amplifier rather than a semiconductor laser. In the figure, reference numeral 66 is a transmitting portion. In the transmitting portion 66, reference numerals 51 to 56 are the same as those in the first example of the construction shown in FIG. 9. For the sake of the simplicity, their description is omitted. However, the positions of the circuits 51 to 56 shown in FIG. 13 differ from those shown in FIG. 9. Reference numeral 57 is an optical intensity modulator which superimposes a sub-signal. Reference numeral 60 is the same as the stabilizing signal erasing portion of the first example of the construction. For the sake of the simplicity, the construction of the stabilizing signal erasing portion 60 is omitted.

The transmitting portion 66 of the transmitter of the second example partially differs from the transmitting portion 50 of the first example. The optical intensity modulator 52 of the transmitter 66 modulates the light which is radiated from the semiconductor laser 51 with a main signal received from the driving circuit 53. The optical intensity modulator 57 receives the sub-signal (burst signal) from the sub-signal superimposing and bias driving circuit 54 and a modulation factor stabilizing signal and performs optical intensity modulation. As with the example shown in FIG. 9, the output of the optical intensity modulator 57 is monitored by the optical branching circuit 55 and the opto-electronic converting circuit 56 and then fed back to the sub-signal superimposing and bias driving circuit 54. Thus, the modulation factor stabilizing operation is performed. The stabilizing signal erasing portion 60 on the later stage erases the stabilizing signal in the same manner as the example shown in FIG. 9.

When an optical intensity modulator is used, the sub-signal superimposing and bias driving circuit 54 of the second example is constructed as shown in FIG. 11. The operating point of the optical intensity modulator 57 is set so that linear modulation is performed. When an optical amplifier is used, the sub-signal superimposing and bias driving circuit 54 is constructed as shown in FIG. 10 or 11.

In the first example shown in FIG. 9 and the second example shown in FIG. 13, an optical output where a main signal has been modulated is monitored and superimposed with a sub-signal. Depending on the mark ratio (which is the ratio where "1s" take place in data sequence consisting of "0s" and "1s"), the average level of the signal which has been modulated varies. Thus, even if the optical output which has been modulated with a main signal is monitored, the output level is not represented correctly. To prevent this problem, an optical output which has not been yet modulated is monitored and superimposed with a sub-signal. This construction is shown as a third example and a fourth example shown in FIGS. 14 and 15, respectively.

Figure 14:
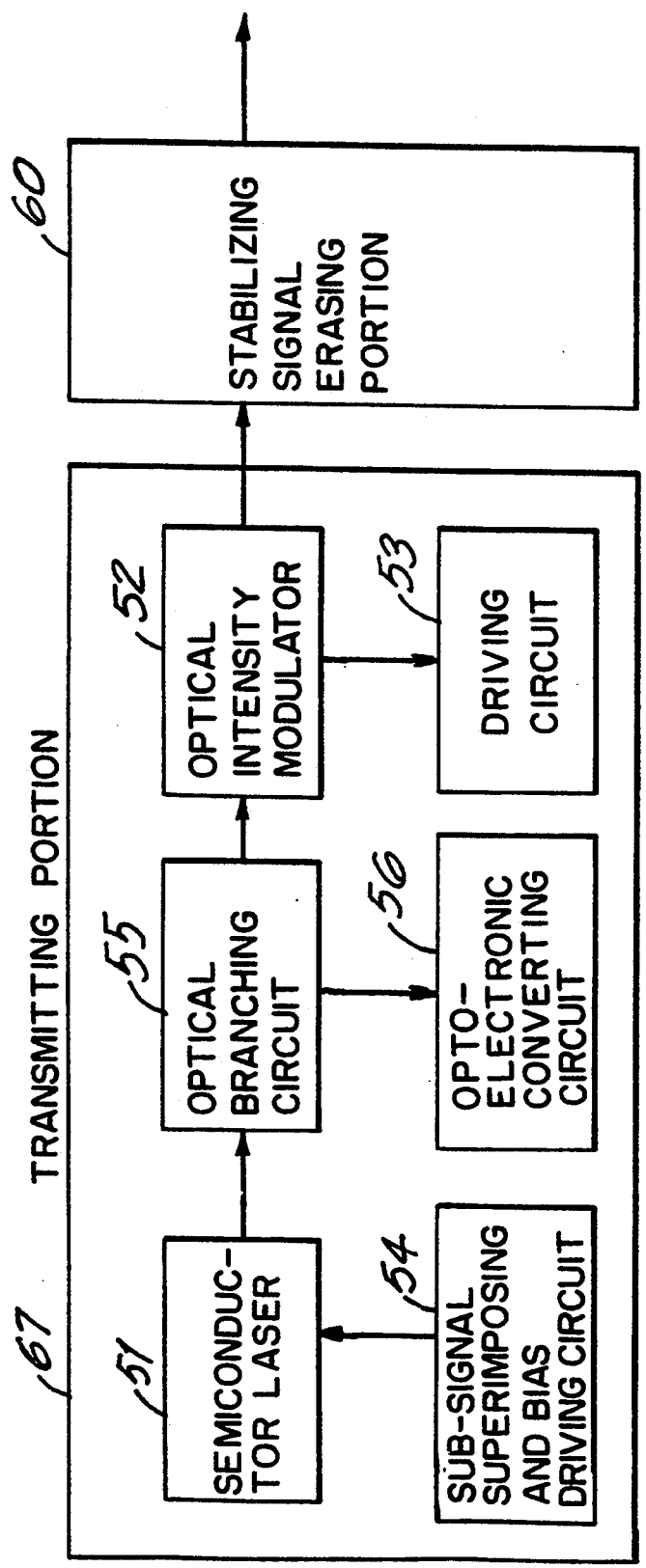
FIG. 14 is a block diagram showing a third example of the construction of the transmitter.

FIG. 14 is a block diagram showing the third example of the construction of the transmitter. In the figure, reference numeral 67 is a transmitting portion which partially differs from the transmitting portion 60 of the first example of the construction. In the transmitting portion 67, reference numerals 51 to 56 are the same as those of the example shown in FIG. 9. For the sake of the simplicity, the description of the circuits 51 to 56 is omitted. However, the positions of the optical intensity modulator 52 and the optical branching circuit 55 differ from those of the example shown in FIG. 9. Reference numeral 60 is the same as the stabilizing signal erasing portion shown in FIG. 9. For the sake of the simplicity, the description of the construction of the stabilizing signal erasing portion 60 is omitted.

In this case, the semiconductor laser 51 generates an optical output where a sub-signal and a modulation factor stabilizing signal are superimposed with the output of the sub-signal superimposing and bias driving circuit 54. The optical output is monitored by the optical branching circuit 55 and the opto-electronic converting circuit 56 and thereby the modulation factor is stabilized. Since the monitor output is not affected by the mark ratio of the data of the main signal, the modulation factor against the optical power can be kept constant. The optical intensity modulator 52 modulates the output of the optical branching circuit 55 with the main signal. The stabilizing signal erasing portion 60 on the later stage erases the stabilizing signal in the same manner as the example shown in FIG. 9.

Figure 15:
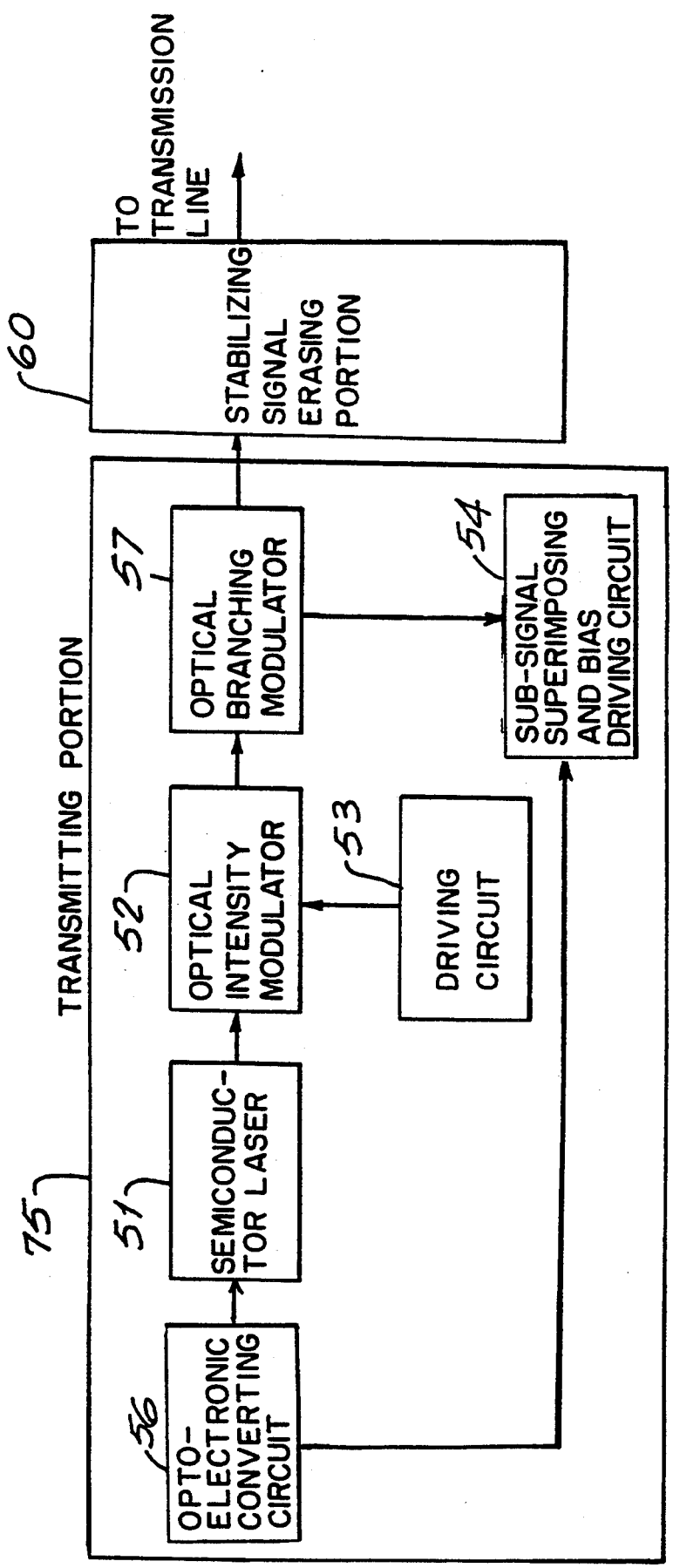
FIG. 15 is a block diagram showing a fourth example of the construction of the transmitter.

FIG. 15 is a block diagram showing the fourth example of the construction of the transmitter. In the figure, reference numeral 68 is a transmitting portion. In the transmitting portion 68, reference numerals 51 to 54, 56, and 57 are the same as those shown in FIG. 13. However, their positions differ between the examples. Reference numeral 60 is the same stabilizing signal erasing portion as each example described above.

In the fourth example of the construction of the transmitter, the back power of the semiconductor laser is monitored by the opto-electronic converting circuit 56 so as to detect the optical output which has not been modulated yet. The result is supplied to the sub-signal superimposing and bias driving circuit 54 as a modulation stabilization control signal. The optical intensity modulator 52 performs optical intensity modulation for the output of the semiconductor laser 51 with a main signal received from the driving circuit 53. The output is supplied to the optical intensity modulator 57. The optical intensity modulator 57 superimposes the sub-signal and the stabilizing signal on the main signal and supplies the output to the stabilizing signal erasing portion 60.

Next, the back power of the semiconductor laser will be described. Generally, semiconductor lasers has two light beams which are radiated in different direction. The stronger light is used for the output light, whereas the weaker light beam is used for the monitoring. In this example, the weaker light beam as a back power is supplied to the opto-electronic converting circuit 56.

In the fourth example of the construction of the transmitter, the optical intensity modulator inputs polarized rays in a uniaxial crystal, applies a modulation voltage to the crystal, varies the phase difference of the surface of the polarized wave, and obtains the output through an analyzer. The optical intensity modulator has the dependency of polarized wave. In this construction, the semiconductor laser and the external modulator which modulates the main signal are directly connected in such a way that the polarized wave is preserved.

Figure 16:
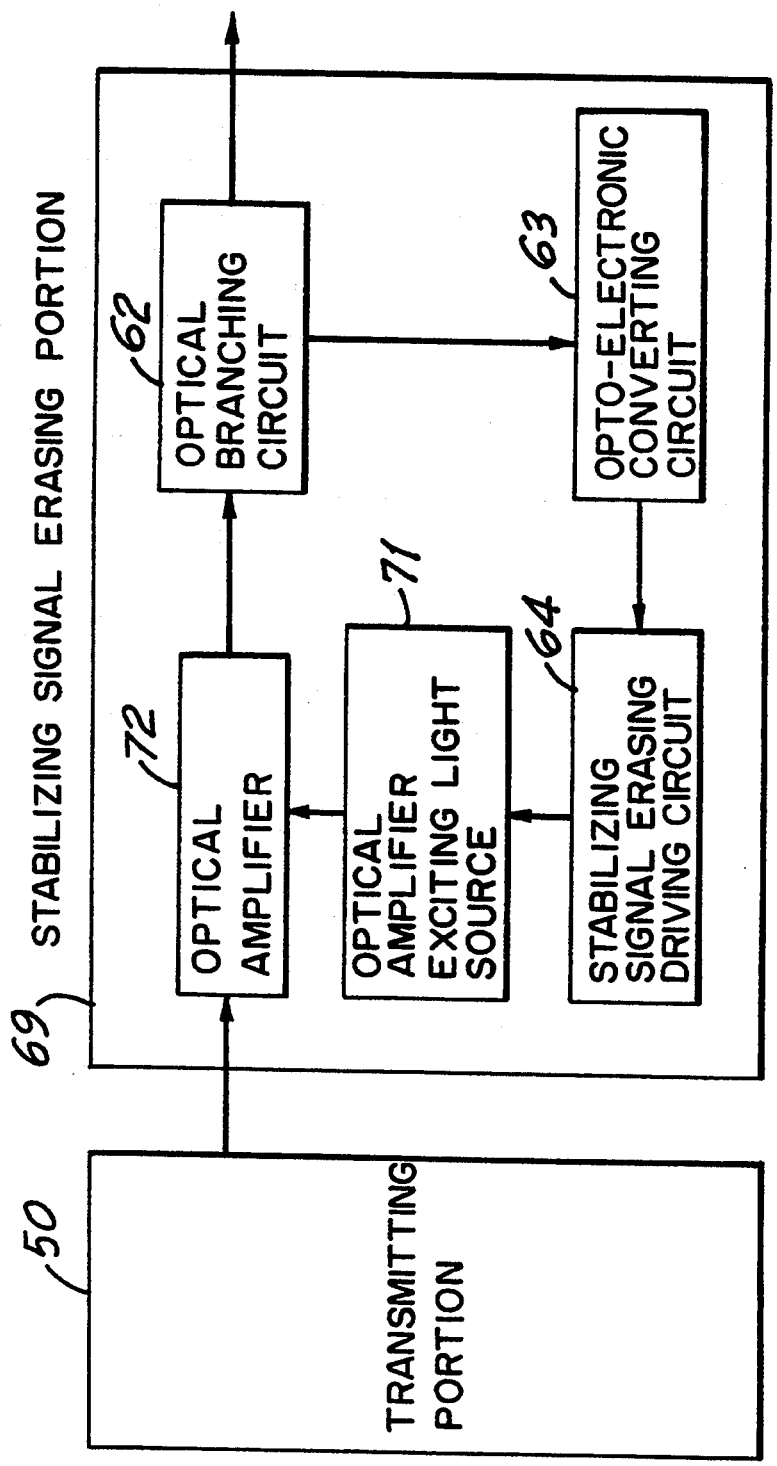
FIG. 16 is a block diagram showing a fifth example of the construction of the transmitter.

FIG. 16 is a block diagram showing a fifth example of the construction of the transmitter. In this example, the transmitting portion 50 is the same as that of the first example of the construction except that the transmission power is increased by using an optical amplifier as an amplifying device of the stabilizing signal erasing portion 69.

In the stabilizing signal erasing portion 69 shown in FIG. 16, reference numerals 62 to 64 are the same as those shown in FIG. 9. Reference numeral 71 is an optical amplifier exciting light source. Reference numeral 72 is an optical amplifier.

In the stabilizing signal erasing portion 69, the optical branching circuit 62 branches an optical signal to the opto-electronic converting circuit 63. The opto-electronic converting circuit 63 supplies the resultant stabilizing signal component to the stabilizing signal erasure driving circuit 64. The stabilizing signal erasure driving circuit 64 generates a drive signal for performing inverse modulation. With the drive signal, the optical amplifier exciting light source 71 is driven. Thus, the optical amplifier exciting light source 71 generates exciting light for the optical amplifier 72. The optical amplifier 72 outputs the amplified signal where the stabilizing signal has been erased.

Figure 17A:
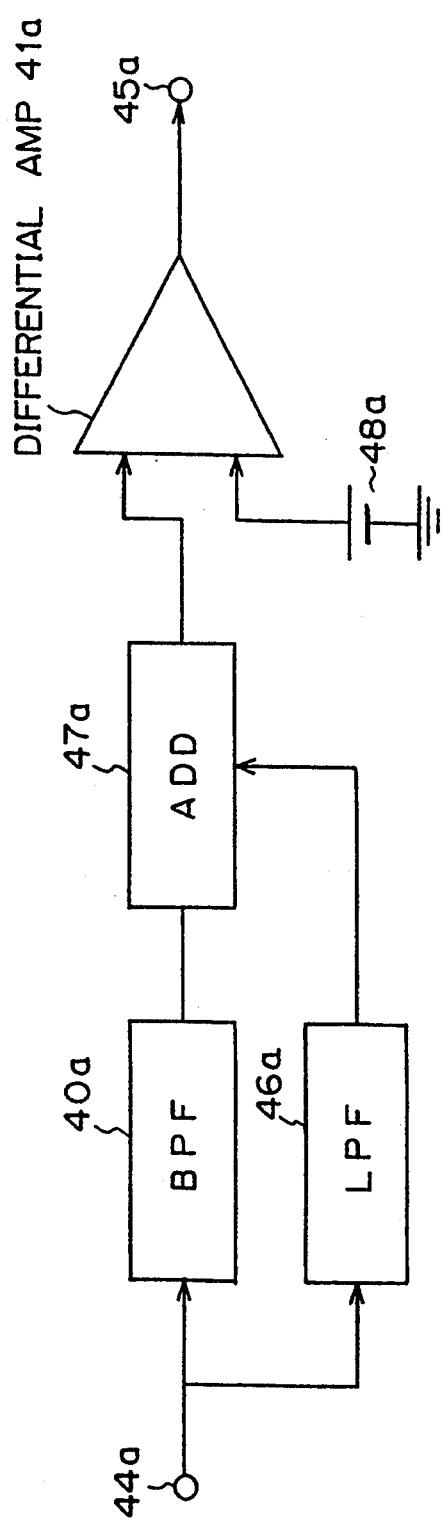
FIG. 17A is a block diagram showing the construction of a stabilizing signal erasure driving circuit for keeping output constant.

In the stabilizing signal erasing portion 69, the stabilizing signal erasure driving circuit 64 may be constructed as shown in FIG. 12A. In addition, the stabilizing signal erasure driving circuit 64 may be constructed as shown in FIG. 17A where an output constant control is performed. When the construction shown in FIG. 12A is changed to that shown in FIG. 17A, the output of the optical amplifier can be kept constant.

FIG. 17A is a block diagram showing the construction of a stabilizing signal erasure driving circuit for keeping output constant. In the construction shown in the figure, reference numerals 40a, 41a, 44a, and 45a are the same as those shown in FIG. 12A. Reference numeral 46a is a low pass filter (LPF). Reference numeral 47a is an adder (ADD). Reference numeral 48a is a reference voltage for setting the average power of an output light.

Figure 17B:
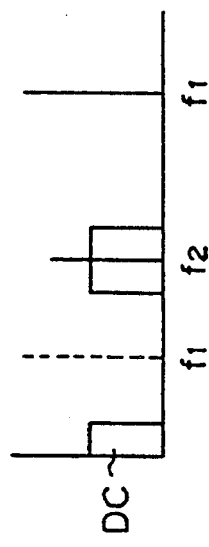
FIG. 17B is a schematic diagram showing a frequency distribution.

FIG. 17B is a schematic diagram showing a frequency distribution of a carrier signal and a stabilizing signal. As shown in the frequency distribution of the figure, the band pass filter 40a extracts the component of frequency f2. The low pass filter 46a extracts the DC component. The adder 47a adds both the components. The differential amplifier 41a compares the output of the adder 47a with the reference voltage 48a. The result is supplied to the optical amplifier exciting light source 71 shown in FIG. 16. Thus, the output of the optical amplifier 72 is kept constant.

In the fifth example of the construction of the transmitter shown in FIG. 16, when the frequency f2 of the stabilizing signal is lower than the carrier frequency f1 of the sub-signal which is superimposed on the main signal, the stabilizing signal erasure driving circuit 64 in the stabilizing signal erasing portion 69 may be substituted with a low pass filter (LPF).

Figure 18A:
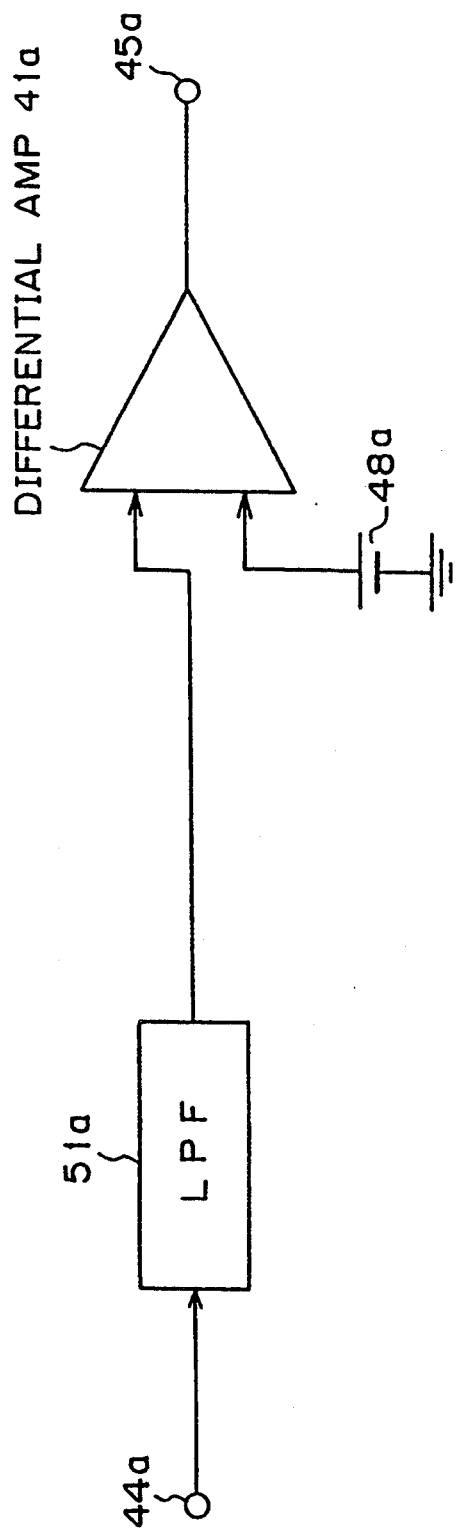
FIG. 18A is a block diagram showing the construction of a stabilizing signal erasure driving circuit where the frequency of a stabilizing signal is lower than that of a sub-signal.
Figure 18B:
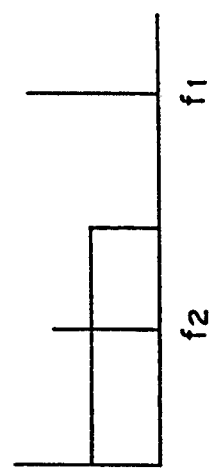
FIG. 18B is a schematic diagram showing a frequency distribution.

FIG. 18A is a block diagram showing the construction of a stabilizing signal erasure driving circuit where the frequency of a stabilizing signal is lower than that of a sub-signal. In the figure, reference numerals 41a, 44a, 45a, and 48a are the same as those shown in FIG. 17A. Reference numeral 51a is a low pass filter (LPF) having a frequency band including the frequency f2 used for the stabilizing signal.

Figure 19:
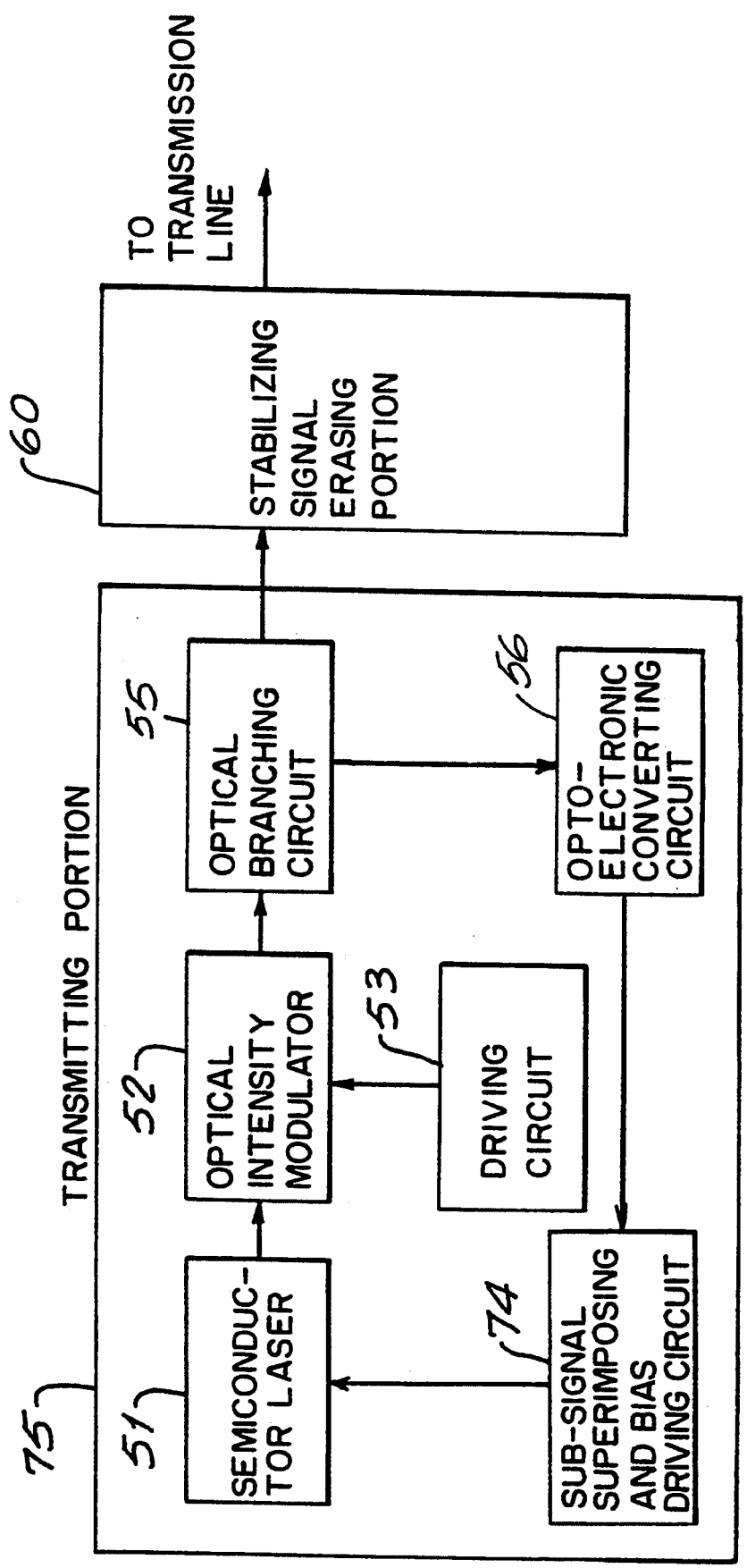
FIG. 19 is a block diagram showing a sixth example of the construction of the transmitter.

FIG. 19 is a block diagram showing a sixth example of the construction of the transmitter. The construction of the sub-signal superimposing and bias driving circuit 74 which has a distortion compensation function differs from the sub-signal superimposing and bias driving circuit 54 of the first example of the construction.

As with the first to fifth examples of the construction of the transmitter, when the optical intensity modulator 61 in the stabilizing signal erasing portion 60 on the later stage controls the gain so as to erase the stabilizing signal, the waveform of the sub-signal whose modulation factor has been stabilized is distorted. The sixth example of the construction of the transmitter is used so as to compensate such a distortion.

Figure 20A:
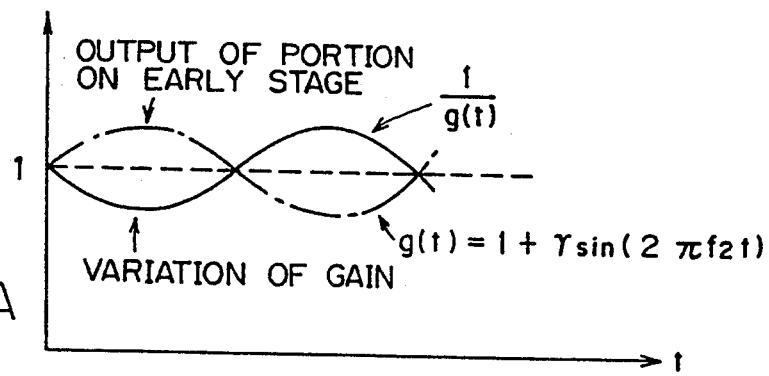
FIG. 20A to 20E are schematic diagrams for explaining the operation of a sixth example of the construction of the transmitter.
Figure 20B:
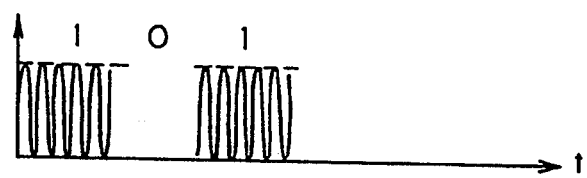
Figure 20C:
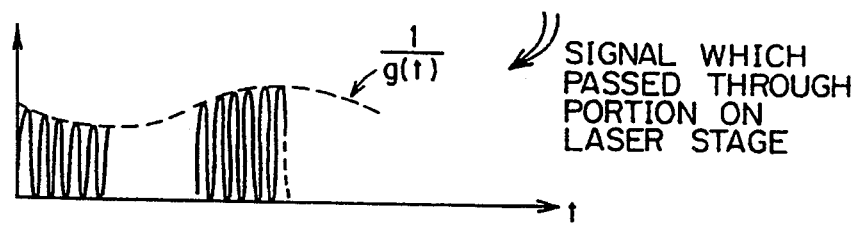

FIG. 20A to 20E are schematic diagrams for explaining the operation of the sixth example of the construction of the transmitter. In each example of the construction, the optical intensity modulator on the later stage (of the stabilizing signal erasing portion) varies the gain of the output on the earlier stage (of the transmitting portion) as shown in FIG. 5C so as to offset the superimposed signal of the stabilizing signal. Thus, the output of the optical intensity modulator is kept constant. However, in the first to fifth examples of the construction of the transmitter, when the output light on the earlier stage (of the transmitting portion) contains a burst signal shown in FIG. 20B, the superimposed burst signal of the output light on the later stage (of the stabilizing signal erasing portion) slightly distorts as shown in FIG. 20C.

To compensate for such a distortion, in this example, as shown in FIG. 20A, before a circuit on the earlier stage superimposes a sub-signal, the amplitude of a burst signal has been modulated. When the superimposed signal which is the stabilizing signal is $\Gamma \sin (2.\pi.f2.t)$ (where $\Gamma$ is modulation factor), the amplitude of the burst signal has been amplified $[1+\Gamma \sin (2.\pi.f2.t)]$ times and modulated.

Figure 20D:
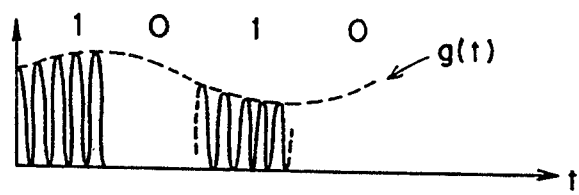
Figure 20E:
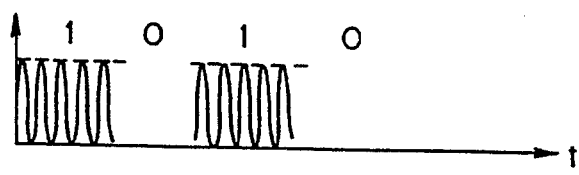

FIGS. 20D and 20E show examples of waveforms where such a compensation is performed. In other words, the circuit on the earlier stage generates an output which contains a burst signal component which has been amplified $[1+\Gamma \sin (2.\pi.f2.t)]$ times and modulated as shown in FIG. 20D. The stabilizing signal erasing portion on the later stage perform inverse modulation with gain of 1/g (t) as shown by the solid line of FIG. 20A. Thus, the output which contains a burst signal free of distortion as shown in FIG. 20E is generated.

Figure 21:
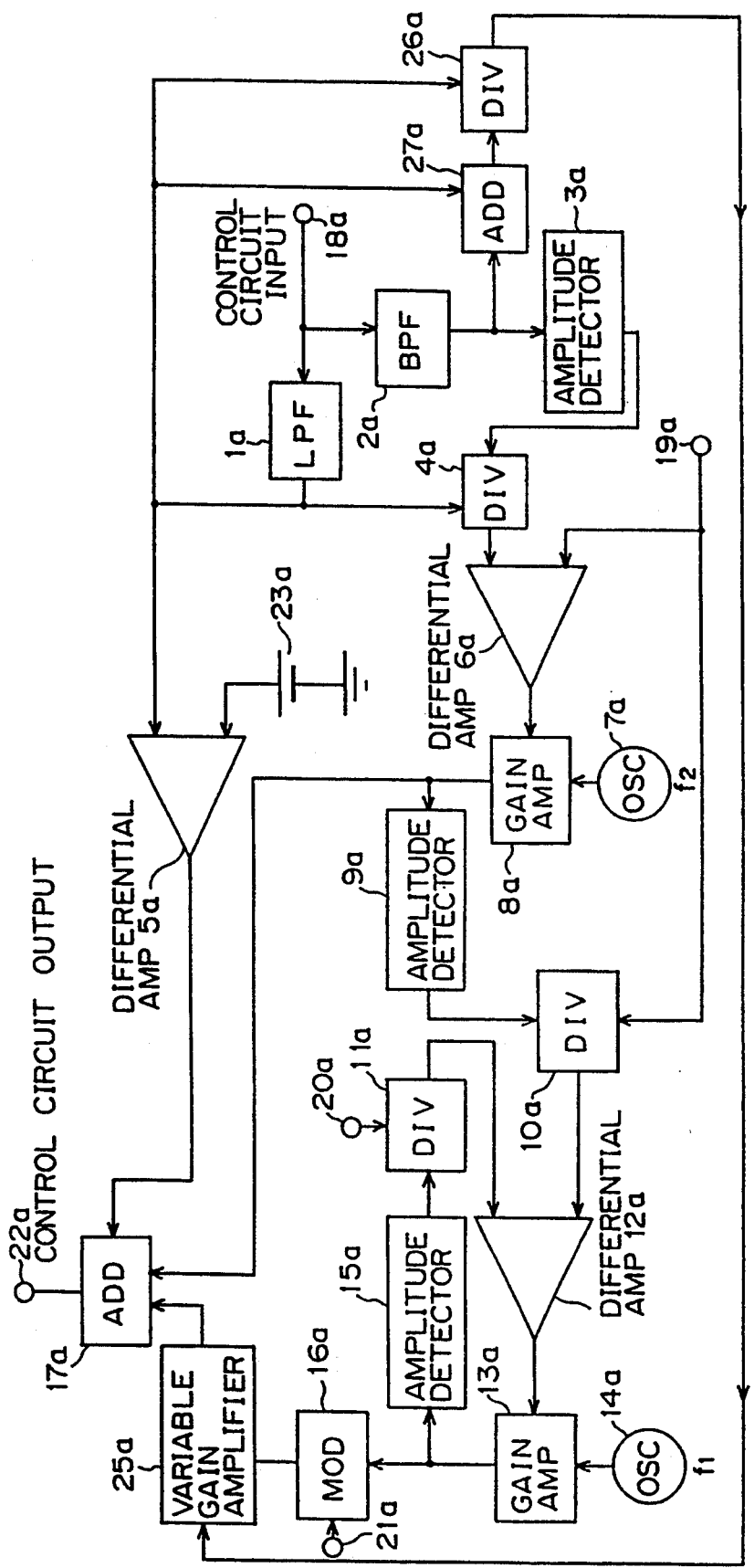
FIG. 21 is a block diagram showing a first example of the construction of a sub-signal superimposing and bias driving circuit for compensating distortion.
Figure 22:
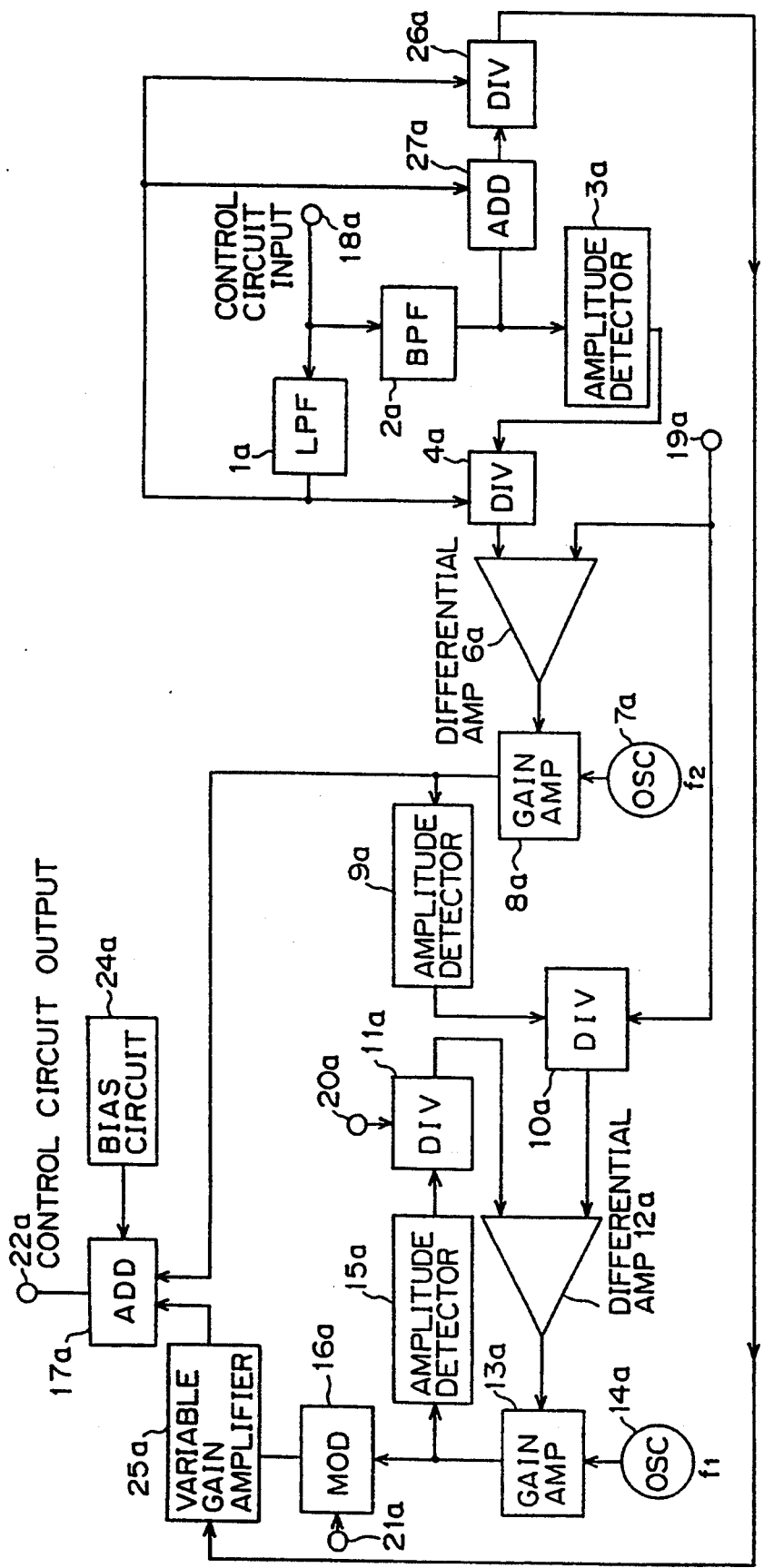
FIG. 22 is a block diagram showing a second example of the construction of the sub-signal superimposing and bias driving circuit for compensating distortion.

FIGS. 21 and 22 show examples of the construction of the sub-signal superimposing and bias driving circuit where the transmitting portion has modulated a burst signal so as to compensate distortion. In these examples, when a sub-signal is superimposed by a semiconductor laser and an optical amplifier, the construction shown in FIG. 21 is used. When a sub-signal is superimposed by an optical intensity modulator, a semiconductor laser, and an optical amplifier, the construction shown in FIG. 22 is used.

FIG. 21 is a block diagram showing a first example of the construction of the sub-signal superimposing and bias driving circuit which compensates distortion. In the figure, circuits denoted by reference numerals 1a to 17a and signals denoted by 18a to 23a are the same as those of the first example of the construction of the sub-signal superimposing and bias driving circuit shown in FIG. 10. For the sake of the simplicity, their description is omitted. Reference numeral 25a is a variable gain amplifier. Reference numeral 26a is a divider (DIV). Reference numeral 27a is an adder (ADD).

In this construction, the low pass filter 1a extracts the DC component from the opto-electronic converting circuit 56 shown in FIG. 19 through the control circuit input 18a and sends the DC component to the adder 27a. The band pass filter 2a extracts a component (g (t)) of a stabilizing signal with a frequency of f2 and supplies the component to the other input of the adder 27a. The adder 27a adds these components and supplies the result (1+g (t)) and the product of the main signal and the mark level to the divider 26a. The divider 26a divides the signal by the DC component and outputs $[1+\Gamma \sin (2.\pi.f2.t)]$. Now, it is assumed that the stabilizing signal to be superimposed is $\Gamma \sin (2.\pi.f2.t)$, where $\Gamma$ is the modulation factor. The output of the divider 26a is supplied to the variable gain amplifier 25a. The variable gain amplifier 25a controls the gain of the signal with the frequency of f1 modulated with the burst signal (supervisory and control signal) and sends the output to the adder 17a. Thus, the gain of the burst signal is variably controlled according to the modulation factor of the stabilizing signal being superimposed so as to prevent the burst signal from being distorted in the stabilizing signal erasing portion on the later stage.

FIG. 22 is a block diagram showing a second example of the construction of the sub-signal superimposing and bias driving circuit which compensates the distortion. In the figure, circuits denoted by reference numerals 1a to 4a and 6a to 17a and 24a and signals denoted by 18a to 22a are the same as those of the second example of the construction of the sub-signal superimposing and bias driving circuit shown in FIG. 11. For the sake of the simplicity, their description is omitted. As with the example shown in FIG. 11, the construction shown in FIG. 22 is used when the modulator is a semiconductor laser, an optical amplifier, or an optical intensity modulator. Thus, a bias circuit 24a (having the construction according to each modulator) for the adder 17a is provided. In the construction shown in FIG. 22, an adder 27a and a divider 26a which are same as those shown in FIG. 21 are provided so as to compensate the distortion. With the output of the divider 26a, the variable gain amplifier 25a is controlled to generate the control circuit output 22a which compensate the distortion.

Figure 23:
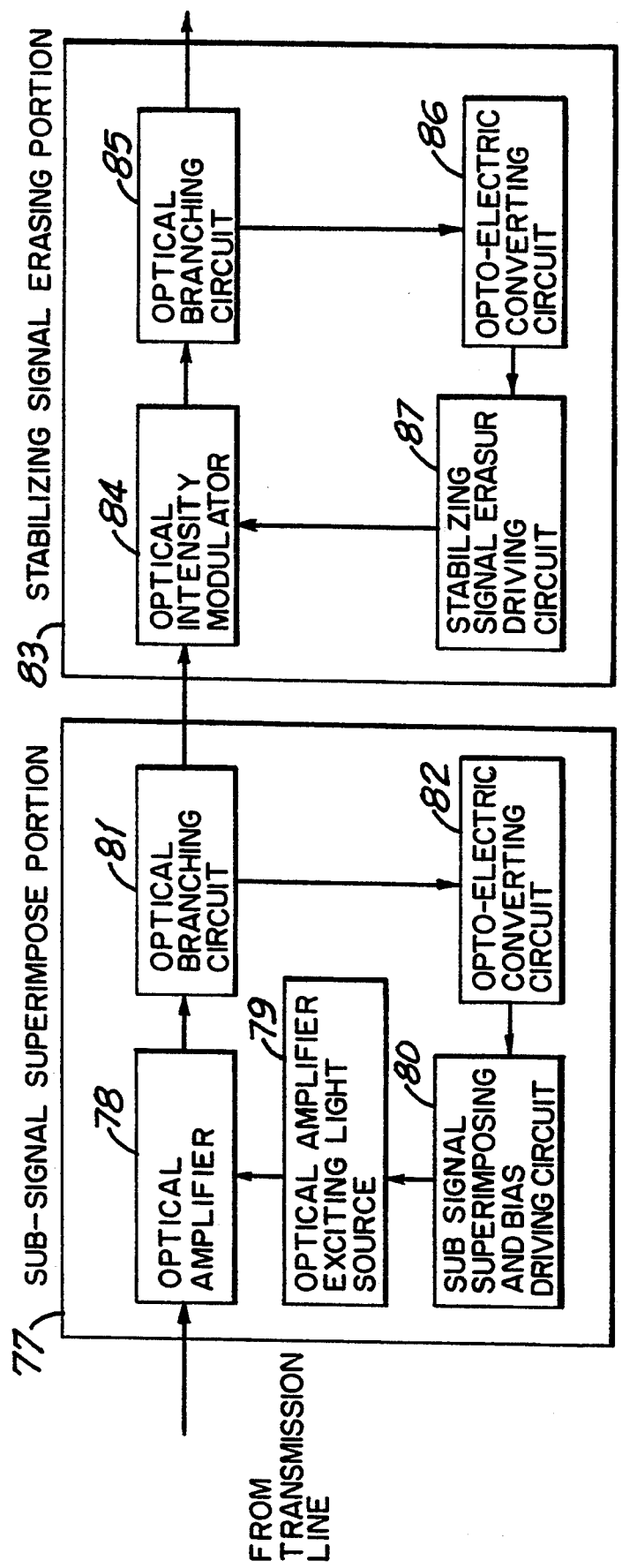
FIG. 23 is a block diagram showing the construction of a non-regenerating repeater as a second embodiment of the present invention.

FIG. 23 is a block diagram showing the construction of a non-regenerating repeater as a second embodiment of the present invention.

In the figure, reference numeral 77 is a sub-signal superimposing portion. Reference numeral 83 is a stabilizing signal erasing portion. In the sub-signal superimposing portion 77, reference numeral 78 is an optical amplifier. Reference 79 is an optical amplifier exciting light source. Reference numeral 80 is a sub-signal superimposing and bias driving circuit. Reference numeral 81 is an optical branching circuit. Reference numeral 82 is an opto-electronic converting circuit. In the stabilizing signal erasing portion 83, reference numerals 84 to 87 have the same functions as the reference numerals 61 to 64 of the stabilizing signal erasing portion 60 of the transmitter as the first embodiment shown in FIG. 9.

The difference between the repeater and the above-described transmitter is in that the repeater is not provided with a driving circuit (which drives a main signal) and a semiconductor laser or an optical intensity modulator (which is driven by the driving circuit). In other words, in the sub-signal superimposing portion 77, the optical amplifier 78 amplifies an optical signal received from the transmitter through the transmission line or the repeater on the earlier stage. In addition, the sub-signal superimposing and bias driving circuit 80 generates a burst signal which constructs a sub-signal (supervisory and control signal transmitted from this repeater) so as to drive the optical amplifier 78. This signal output drives the optical amplifier 78. Part of the output of the optical amplifier 78 is branched by the optical branching circuit 81 to the sub-signal superimposing and bias driving circuit 80 through the opto-electronic converting circuit 82. Most of the output of the optical amplifier 78 is supplied to the stabilizing signal erasing portion 83. Thus, the stabilizing signal is erased and the resultant signal is sent to the transmission line.

The sub-signal superimposing and bias driving circuit 80 which is a constructional part of the repeater shown in FIG. 23 is the same as the sub-signal superimposing and bias driving circuit 54 of the first to fifth examples of the construction of the above-described transmitter. Practically, the sub-signal superimposing and bias driving circuit 54 is constructed as shown in FIG. 10 or 11. Likewise, the stabilizing signal erasure driving circuit 87 in the stabilizing signal erasing portion 83 is the same as that of each example of the construction of the above-described transmitter. Practically, the stabilizing signal erasure driving circuit 87 is constructed as shown in FIG. 12A.

The optical intensity modulator 84 in the stabilizing signal erasing portion 83 shown in FIG. 23 may be substituted with the construction of "an optical amplifier and an optical amplifier exciting light source" with the sub-signal superimposing portion 77 shown in FIG. 23. In addition, the optical amplifier 78 and the optical amplifier exciting light source 79 in the sub-signal superimposing portion 77 may be substituted with an optical intensity modulator. However, when the optical intensity modulator is driven, the construction of the sub-signal superimposing and bias driving circuit 80 should be the same as that shown in FIG. 11. The construction of the stabilizing signal erasure driving circuit 87 should be the same as that shown in FIG. 12A or 17.

When an optical amplifier is driven, the sub-signal superimposing and bias driving circuit 83 should be constructed as shown in FIG. 10 or 11. The stabilizing signal erasure driving circuit 87 should be constructed as shown in FIG. 12A.

Figure 25:
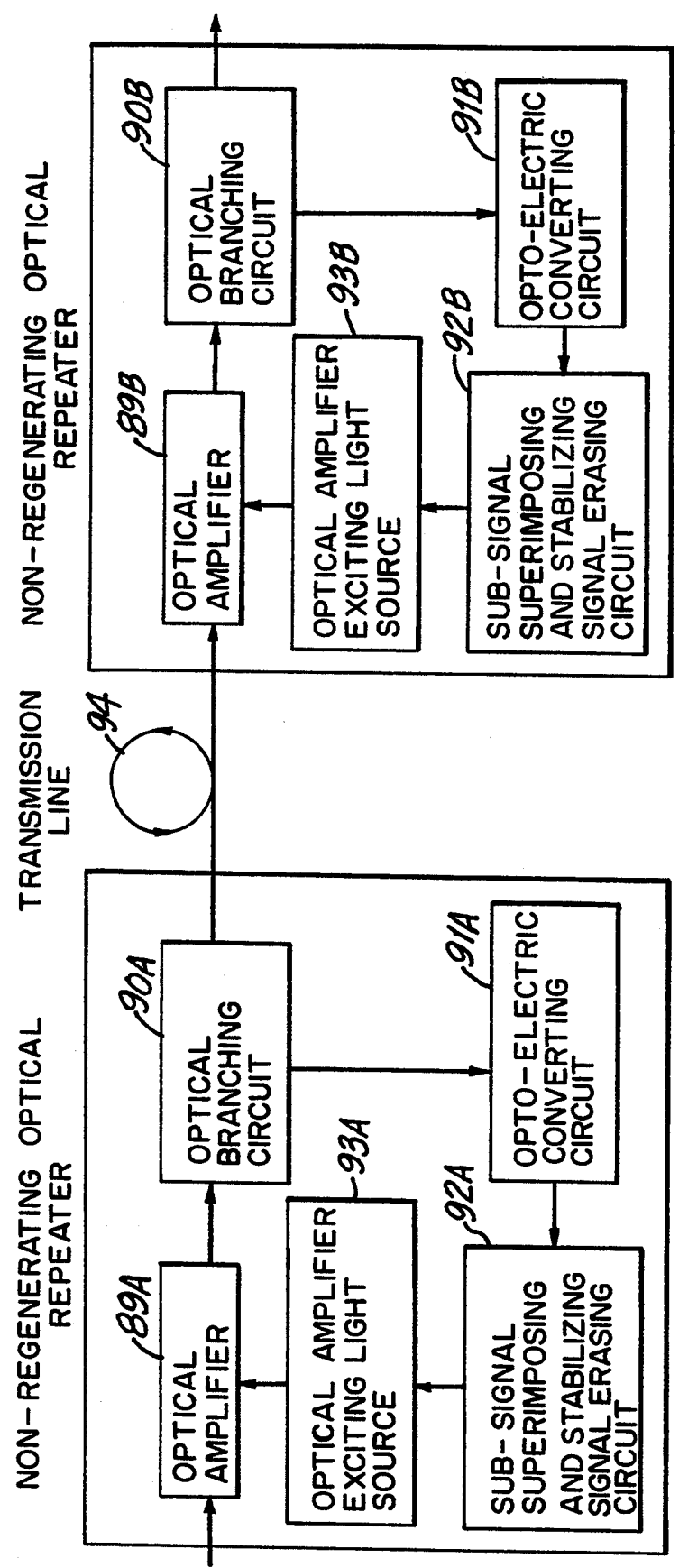
FIG. 25 is a block diagram showing the construction of an non-regenerating repeater system as a third embodiment of the present invention.

In addition, when the stabilizing signal erasure driving circuit 87 of the repeater is constructed as shown in FIG. 21 or 25, as with the sixth example of the construction of the above-described transmitter, the stabilizing signal erasure driving circuit 87 may include a distortion compensating circuit. When the device to be driven is an optical intensity modulator, the stabilizing signal erasure driving circuit should be constructed as shown in FIG. 22.

According to another example of the construction of the repeater, when the frequency of the stabilizing signal is lower than the carrier frequency to be superimposed, the stabilizing signal erasure driving circuit 87 may be simply constructed as shown in FIG. 18A.

When the average optical power is monitored and kept constant in the repeater, spontaneous emission noise (natural light) of the optical amplifiers is accumulated. Thus, after the main signal component pass through many stages of optical repeaters, it will equivalently decrease. To prevent this problem, successive waves with a frequency of f5 are superimposed on the main signal with a small amplitude and the outputs of the optical repeaters are kept constant so that the effect of the natural light is reduced. In this case, as the sub-signal superimposing and bias driving circuit 80, one of the constructions shown in FIGS. 10, 11, 21, and 22 is used. When the construction shown in FIG. 17A is used as the stabilizing signal erasure driving circuit 87, the low pass filter 1a (FIG. 10, 11, 21, or 22) and the low pass filter 46a (FIG. 17A) to which the monitor signal is supplied may be substituted with [a band pass filter with a center frequency of f3 and a amplitude detector]. The construction of the stabilizing signal erasure driving circuit shown in FIG. 12A may be used as it is. Thus, the level diagram (different of signal levels) depends on each span (between repeaters).

Figure 24A:
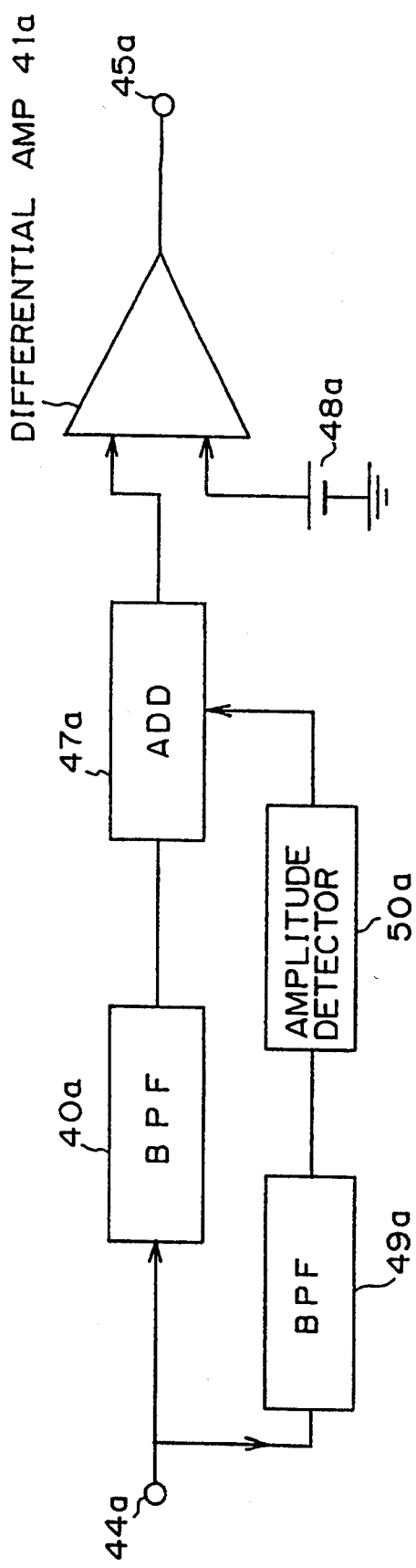
FIG. 24A is a block diagram showing another example of the construction of the stabilizing signal erasure driving circuit.

FIG. 24A is a block diagram showing an example of the construction of the stabilizing signal erasure driving circuit where part of the construction shown in FIG. 17A is substituted. In the figure, reference numeral 40a is a band pass filter (BPF) with a band including a frequency f2. Reference numeral 47a is an adder (ADD). Reference numeral 48a is a reference voltage for setting the output light of the stabilizing signal erasing portion. Reference numeral 49a is a band pass filter (BPF) with a center frequency of f5. Reference numeral 50a is an amplitude detector. Reference numerals 41a, 44a, and 45a are the same as those shown in FIG. 17A. For the sake of the simplicity, their description is omitted.

Figure 24B:
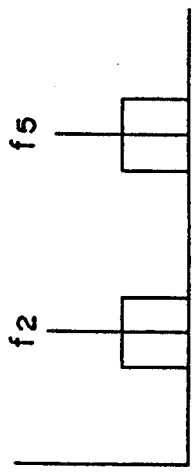
FIG. 24B is a schematic diagram showing a frequency distribution.

FIG. 24B is a schematic diagram showing a frequency distribution. As shown in the figure, the band pass filter 49a and the amplitude detector 50a extract the component of the frequency f5. The adder 47a adds the output of the amplitude detector 50a and the component of the frequency f2 received from the band pass filter 40a. Thus, the differential amplifier 41a generates an erasure drive signal.

FIG. 25 is a block diagram showing the construction of non-regenerating repeater system of a third embodiment of the present invention.

Figures 26A, 26B:
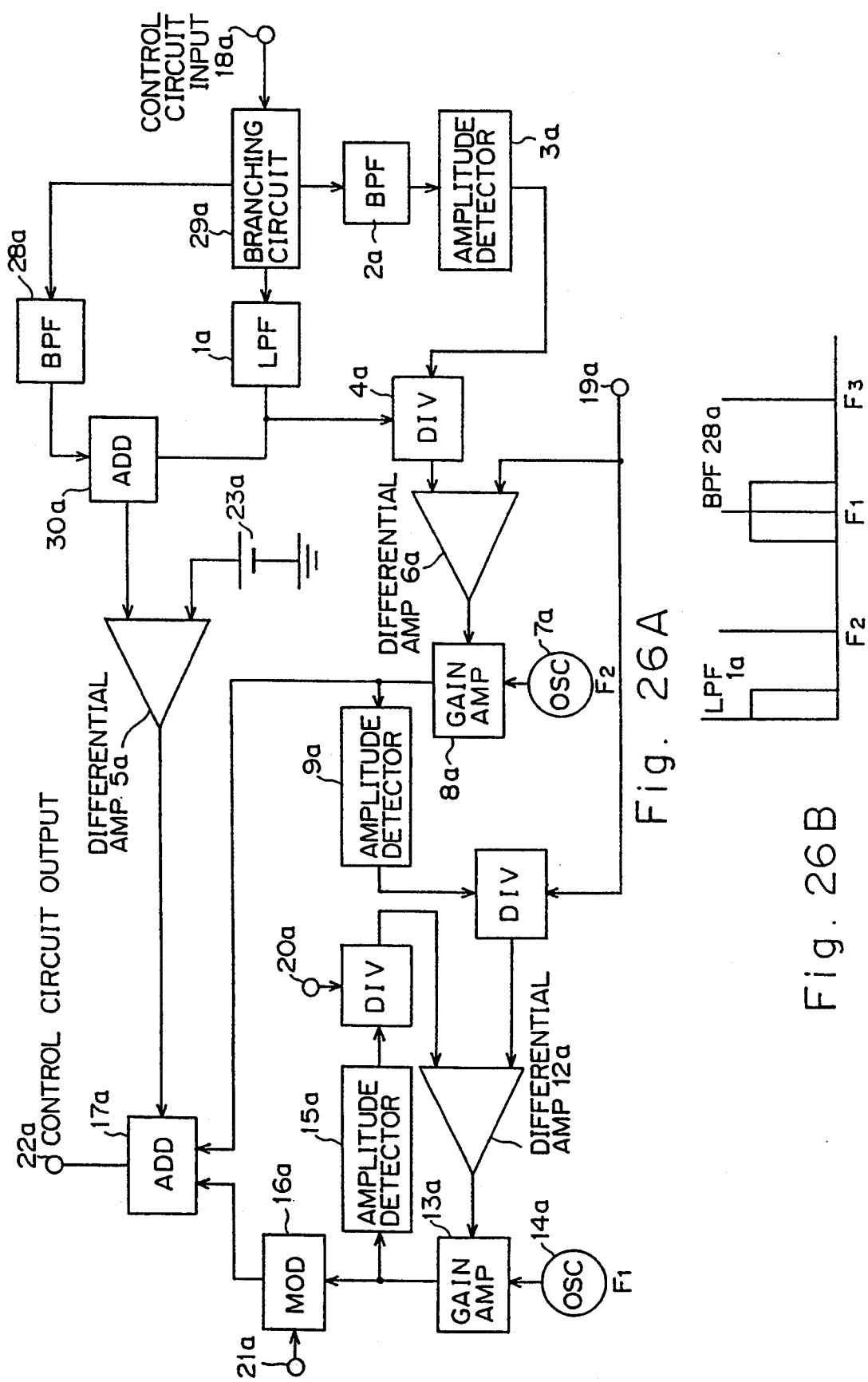
FIG. 26A is a block diagram showing a first example of the construction of the sub-signal superimposing and bias driving circuit.
FIG. 26B is a schematic diagram showing a frequency distribution.

In the figure, reference numerals 88A and 888 are non-regenerating optical repeaters. Reference numeral 94 is a transmission line. The construction of the non-regenerating optical repeater 88A is the same as that of the non-regenerating optical repeater 88B, Reference numerals 89A and 89B are optical amplifiers, Reference numerals 90A and 90B are optical branching circuits, Reference numerals 91A and 91B are opto-electronic converting circuits, Reference numerals 92A and 92B are sub-signal superimposing and stabilizing signal erasing circuits, Reference numerals 93A and 93B are optical amplifier exciting light sources, The sub-signal superimposing and stabilizing signal erasing circuits 92A and 92B are combination circuits of the sub-signal superimposing and bias driving circuit 54 shown in FIG. 9 and the stabilizing signal erasure driving circuit 64 shown in FIG. 9 which are used in the example of the construction of the above-described transmitter and repeater, The practical construction of the sub-signal superimposing and stabilizing signal erasing circuit is shown in FIG. 26A, In the construction of the repeater shown in FIG. 23, the sub-signal superimposing portion 77 and the stabilizing signal erasing portion 83 each use the optical amplifier 78 and the optical intensity modulator 84 (or an optical amplifier), Thus, two units which amplify (modulate) light should be provided. However, when two optical amplifiers with high performance are used, the cost will rise. To solve this problem, in the repeater system shown in FIG. 25, the non-regenerating repeaters 88A and 88B each have a construction which accomplishes both the sub-signal superimposing function and the stabilizing signal erasing function.

In FIG. 25, the sub-signal superimposing and stabilizing signal erasing circuits 92A and 92B of each repeater superimpose successive waves with a frequency of F2 which is outside the band of the carrier frequency F1 of the sub-signal (supervisory and control signal) as a modulation factor stabilizing signal so as to stabilize the modulation factor of the sub-signal F1 and erase the component with a frequency of F3.

For example, the non-regenerating optical repeater 88A sets f4 as F2 (modulation factor stabilizing signal) and f3 as F1 (sub-signal carrier signal). The frequency to be erased is the frequency of the modulation factor stabilizing signal used in the repeater on the earlier stage (not shown). The optical signal (including the sub-signal as a carrier with a frequency of f3 and stabilizing signal with a frequency of f4 supplied from the non-regenerating optical repeater 88A is sent to the non-regenerating optical repeater 88B through the transmission line 94.

The non-regenerating optical repeater 88B sets f2 as F2 (frequency of the modulation factor stabilizing signal), f1 as F1 (frequency of the sub-signal as a carrier), and f4 as F3 (frequency of signal to be erased). Thus, the stabilizing signal with the frequency of f4 used in the preceding repeater is erased. In this case, the frequency f2 should differ from the frequency f4. In addition, these frequencies f2 and f4 should be outside the band of the carrier frequencies f1 and f3 of the sub-signal.

FIG. 26A is a block diagram showing a first example of the construction of the sub-signal superimposing and stabilizing signal erasing circuit. In the construction shown in the figure, reference numerals 1a to 23a are the same as those of the sub-signal superimposing and bias driving circuit shown in FIG. 10. Reference numeral 2a is a low pass filter which passes a frequency F2 of the oscillator 7a. Reference numeral 14a is an oscillator for a sub-signal as a carrier with a frequency of F1. Reference numeral 23a is a reference voltage for setting the average power of the output light. Reference numeral 28a is a band pass filter (BPF) with a center frequency of F3. Reference numeral 29a is a branching circuit. Reference numeral 30a is an adder (ADD).

FIG. 26B is a schematic diagram showing a frequency distribution of above-described F1, F2, and F3. Next, with reference to FIG. 26B, the operation of the construction of FIG. 26A will be described. The control circuit input 18a connected to the opto-electronic converting circuit 91A or 91B shown in FIG. 25 is branched into three paths. One path is connected to the band pass filter 28a. The band pass filter 28a extracts the frequency F3 (frequency to be erased) and sends the output to the adder 30a. The second path of the branching circuit 29a is connected to the low pass filter 1a. The low pass filter 1a extracts the DC component. The output of the low pass filter 1a is sent to the adder 30a. The output of the adder 30a is sent to the differential amplifier 5a. The differential amplifier 5a compares the output of the adder 30a with the reference voltage. The differential amplifier 5a generates an output signal for erasing the component of the frequency F3. The output signal of the differential amplifier 5a is sent to the adder 17a.

The other path (third path) of the branching circuit 29a is connected to the low band pass filter 2a. The low band pass filter extracts a signal containing the component of the frequency F2 of the stabilizing signal. The output of the low band pass filter 2a is sent to the divider 4a through the amplitude detector 3a. The divider 4a divides the output of the amplitude detector 3a by the DC component supplied from the low pass filter 1a. The output of the divider 4a is sent to the differential amplifier 6a. The differential amplifier 6a compares the output of the divider 4a with the reference value. The other construction of the sub-signal superimposing and signal erasing circuit is the same as that shown in FIG. 10. With the signal of the frequency F2, the modulation factor of the carrier frequency F1 is stabilized.

Figure 27:
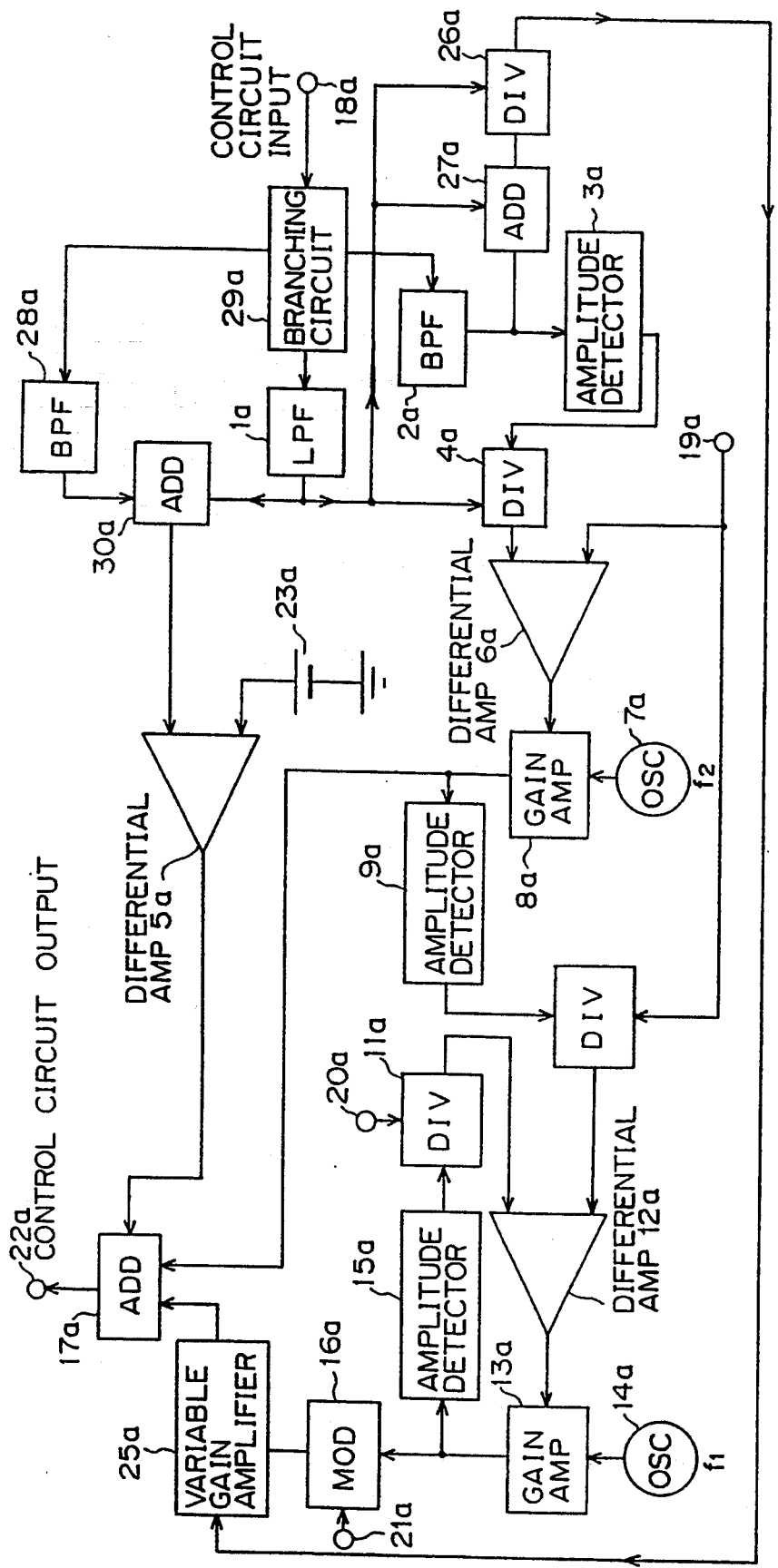
FIG. 27 is a block diagram showing a second example of the construction of the sub-signal superimposing and bias driving circuit.

FIG. 27 is a block diagram showing a second example of the construction of the sub-signal superimposing and stabilizing signal erasing circuit. This construction differs from that shown in FIG. 26A in that a waveform distortion compensating function is provided. In FIG. 27, reference numerals 1a to 23a and 25a to 27a are the same as those of the sub-signal superimposing and bias driving circuit having the distortion compensating function shown in FIG. 21. Reference numerals 28a, 29a, and 30a are the same as those shown in FIG. 26A. In this construction, the DC component of the signal received from the control circuit input 18a is supplied to the adder 27a. The adder 27a adds the DC component and the component with a frequency of F2. The divider 26a divides the output of the adder 27a by the DC component. Thus, the modulation factor is obtained and thereby the variable gain amplifier 25a is controlled so as to compensate the distortion of waveform. The band pass filter 28a extracts the component of the frequency F3. In the same construction shown in FIG. 26A, the component of the frequency F3 is erased.

The construction shown in FIG. 27 is used as the sub-signal superimposing and stabilizing signal erasing circuit 92A (92B) of the non-regenerating optical repeaters 88A (88B) of the repeater system shown in FIG. 25. The assignment of the frequencies F1, F2, and F3 is the same as that shown in FIG. 26B.

The first to third embodiments which accomplish the first object of the present invention has been described in detail. Next, a fourth embodiment which accomplishes the second object of the present invention will be described.

Figure 28:
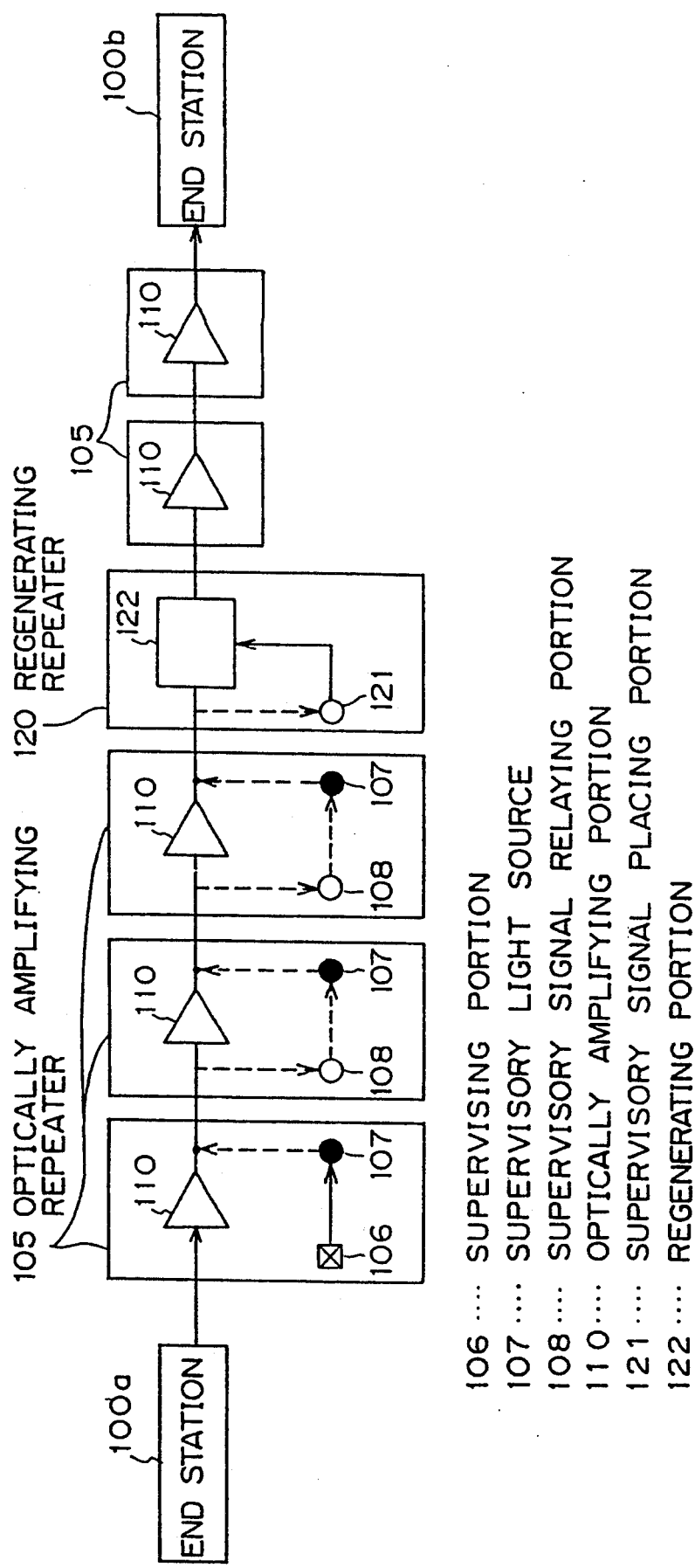
FIG. 28 is a block diagram showing the overall construction of an optical amplifying repeater system having optical amplifying repeaters and a reproducing repeater as a fourth embodiment of the present invention.

FIG. 28 is a block diagram showing the overall construction of an optically amplifying repeater system having both optically amplifying repeaters and a reproducing repeater of a fourth embodiment of the present invention.

In the figure, reference numerals 100a and 100b are end stations. Reference numeral 105 is an optically amplifying repeater. Reference numeral 120 is a reproducing repeater.

To accomplish the second object of the present invention, the forth embodiment is an optically amplifying repeater system comprising an end station 100a which sends a main signal, a reproducing repeater 120 which receives and relays the main signal, and optically amplifying repeaters 105 which optically amplify and relay the main signal to another end station.

In other words, in the optically amplifying repeater system, the optically amplifying repeater 105 comprises a supervising portion 106 which detects a defect and a dedicated supervising light source 107 which generates a supervisory signal for sending defect information. The reproducing repeater 120 comprises a supervisory signal placing portion 121 which receives the supervisory signal and places the defect information of the supervisory signal into the main signal. When necessary, for example, the second or later optically amplifying repeater 105 counted from the end station 100a is provided with a supervisory signal relaying portion 108 which receives and relays the supervisory signal. In the figure, the second or later optically amplifying repeaters are not provided with the supervising portion 106. However, it should be noted that the supervising portion 106 can be provided in such repeaters.

In FIG. 28, the supervising portion 106 in an optically amplifying repeater 105 supervises the repeater 105 itself and detects a defect. An optically amplifying repeater 105 which has detected a defect sends a supervisory signal to the reproducing repeater 120 on the later stage in the following manner.

When the second and later optically amplifying repeaters are not provided with the supervisory signal relaying portion 108, the supervisory light source 107 of an optically amplifying repeater 105 whose supervising portion 106 has detected a defect outputs a supervisory signal. An optically amplifying repeaters 105 optically amplify and relay the supervisory signal to another optically amplifying repeater 105 on a later stage.

When the supervisory signal relaying portion 108 is provided, the supervisory light source 107 of an optically amplifying repeater 105 whose supervising portion 106 has detected a defect sends a supervisory signal. An optically amplifying repeater 105 on the later stage receives the supervisory signal from the supervisory signal relaying portion 108 and reproduces and relays the supervisory signal to another optically amplifying repeater 105 on the more later stage by the supervisory light source 107.

The supervisory signal reproduced and relayed or optically amplified and relayed is received by the reproducing repeater 120. In the reproducing repeater 120 which has received the supervisory signal, the supervisory signal placing portion 121 writes the defect information to SOH (F1 byte) of the main signal. Thus, the defect information is placed in the main signal. Thereafter, the defect information as part of the main signal is stably sent to the end station.

Figure 29:
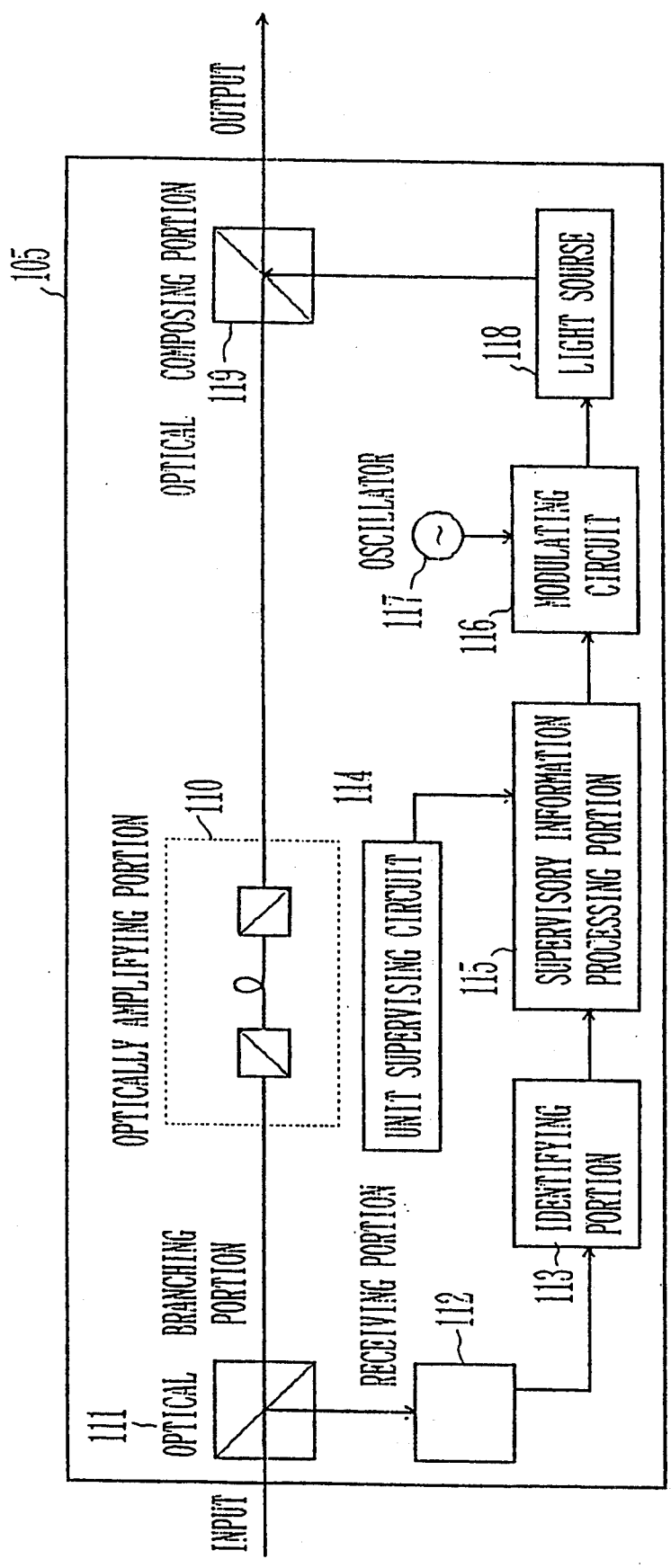
FIG. 29 is a block diagram showing the construction of an optical amplifying repeater as the fourth embodiment of the present invention.

FIG. 29 is a block diagram showing an example of the construction of an optically amplifying repeater of the fourth embodiment of the present invention. In the figure, reference numeral 111 is an optical branching portion which branches both a main signal which is received from an optically amplifying repeater 105 on the earlier stage and an optical signal which contains a supervisory signal. Reference numeral 112 is a receiving portion constructed of a photo diode (PD) or the like. The receiving portion 112 receives an optical signal from the optical branching portion 111. Reference numeral 113 is an identifying portion which identifies a supervisory signal from a signal received by the receiving portion 112. Reference numeral 114 is a unit supervising circuit which supervises an optically amplifying portion 110 and so forth and detects a defect. Reference numeral 115 is a supervisory information processing portion which signalizes defect information received from the unit supervising circuit 114 or the identifying portion 113 and outputs the defect information received from the identifying portion 113 with the highest priority. Reference numeral 116 is a modulating circuit which modulates the output amplitude of an oscillator 117 according to the defect information signalized by the supervisory information processing portion 115. Reference numeral 118 is a supervisory light source which is driven by the modulating circuit 116 and converts the supervisory signal into an optical signal. Reference numeral 119 is an optically composing portion which composes the supervisory signal received from the supervisory light source 118 to the main signal.

Figure 30:
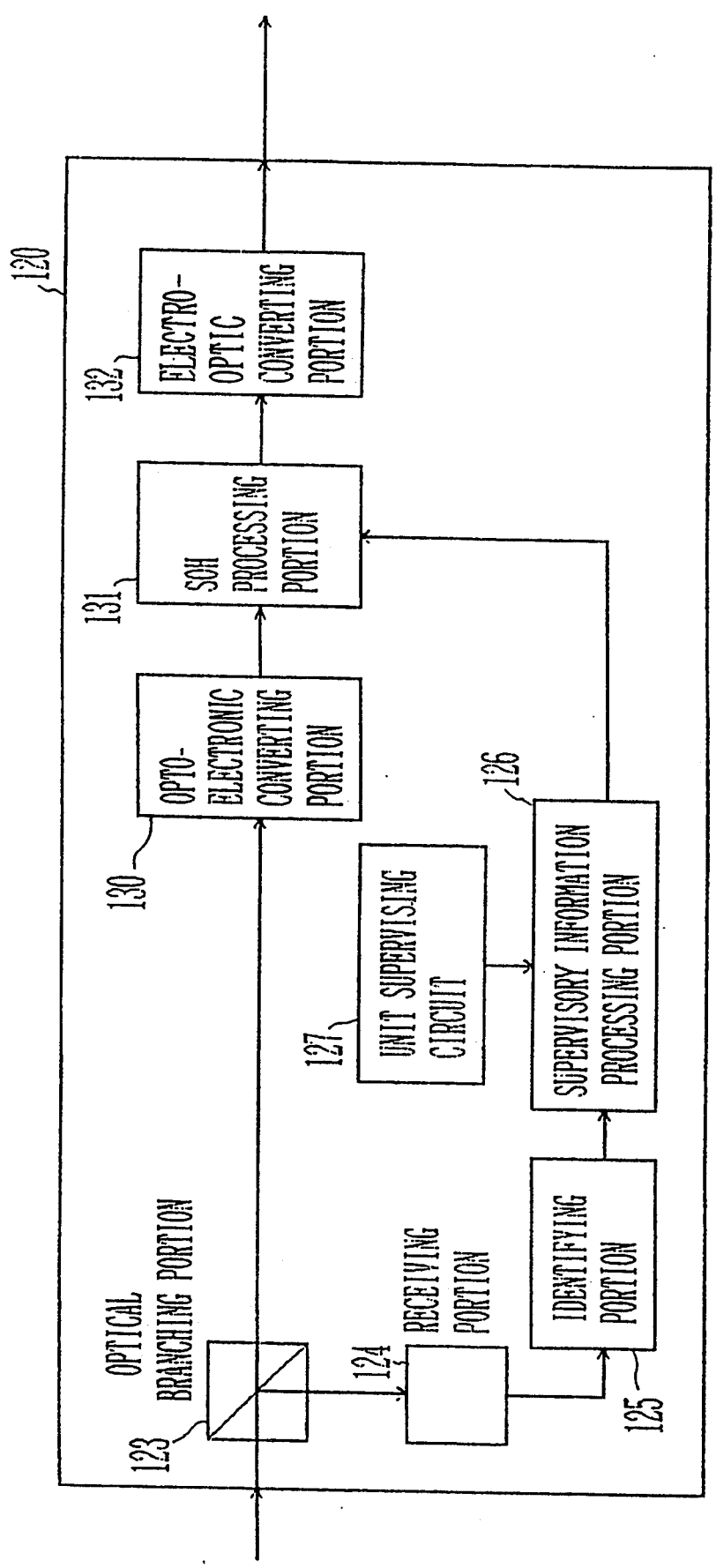
FIG. 30 is a block diagram showing the construction of a reproducing repeater as the fourth embodiment of the present invention.

FIG. 30 is a block diagram showing an example of the construction of a reproducing repeater of the fourth embodiment of the present invention. In the figure, reference numeral 123 is an optical branching portion which branches both a main signal received from an optically amplifying repeater 105 on the earlier stage and an optical signal which contains a supervisory signal. Reference numeral 124 is a receiving portion which is constructed of a photo diode (PD) or the like. The receiving portion 124 receives an optical signal received from the optical branching portion 123. Reference numeral 125 is an identifying portion which identifies a supervisory signal from a signal received from the receiving portion 124. Reference numeral 126 is a supervisory information processing portion which signalizes the defect information received from a unit supervising circuit 127 or the identifying portion 125 and outputs the defect information received from the identifying portion 125 with the highest priority. Reference numeral 130 is an electro-optical converting portion which receives an optical signal from the optical branching portion 123, converts the main signal from optical signal into electrical signal, and reproduces the main signal. Reference numeral 131 is an SOH processing portion. The SOH processing portion 131 writes defect information received from the supervisory information processing portion to the SOH (F1 byte) of the main signal being reproduced and performs various processes. Reference numeral 132 is an electro-optic converting portion which converts the main signal received from the SOH processing portion from an electrical signal into an optical signal and sends the signal to a unit on the later stage.

Figure 31:
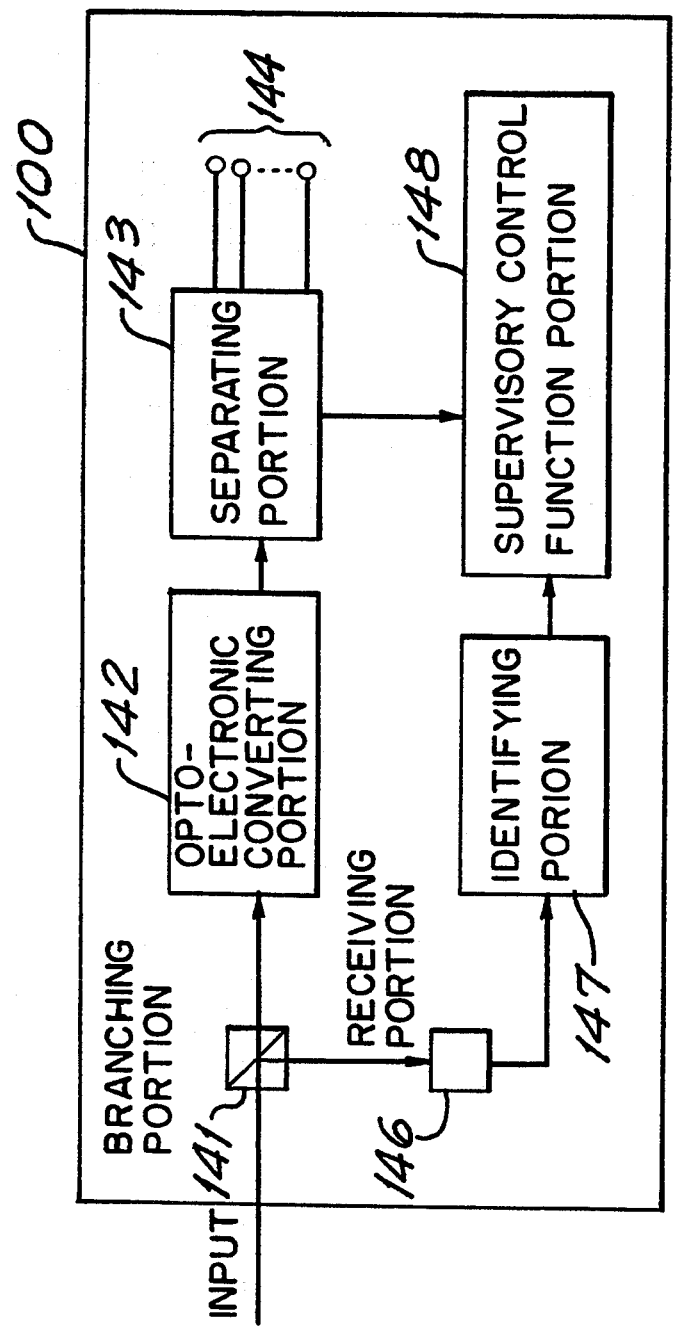
FIG. 31 is a block diagram showing the construction of an end station as the fourth embodiment of the present invention.

FIG. 31 is a block diagram showing an example of the construction of an end station as the fourth embodiment of the present invention. In the figure, reference numeral 141 is an optical branching portion which branches both a main signal received from a unit on the earlier stage and an optical signal which contains a supervisory signal. Reference numeral 142 is an opto-electronic converting portion which receives an optical signal from the optically branching portion 141, converts the main signal from optical signal into electrical signal, and reproduces the main signal. Reference numeral 143 is a separating portion which converts the main signal from parallel sequence into serial sequence and sends a separation signal to an separation signal output terminal 144. Reference numeral 146 is a receiving portion which is constructed of a photo diode (PD) or the like. The receiving portion 146 receives an optical signal from the optically branching portion 141. Reference numeral 147 is an identifying circuit which identifies a supervisory signal from a signal received from the receiving portion 146. Reference numeral 148 is a supervisory and control function portion which performs maintenance operations according to defect information (information placed in the main signal) received from an optically amplifying repeater 105 on the earlier stage and defect information (which is not placed in the main signal) received from the separating portion 143.

Next, with reference to FIGS. 28 to 31, the construction where the supervisory signal relaying portion is provided in an optically amplifying repeater will be described.

As shown in FIG. 29, an optically amplifying repeater 105 is provided with a supervisory light source 118 as a dedicated light source for outputting defect information (this light source is equivalent to the supervisory light source 107 shown in FIG. 28).

When EDF (erbium doped fiber) is used for the optically amplifying portion 110, the oscillating wavelength is for example in 1.48 [μm] band. The light of 1.48 [/μ/m] band has a low loss in optical fiber. In addition, the EDF has large light absorption. Thus, a supervisory signal newly generated by the supervisory information processing portion 115 does not interfere with a supervisory signal which passes through the optically amplifying portion 110. Thus, the deterioration of the transmission quality of the supervisory signal can be suppressed.

The optically amplifying portion 110 may be provided with an optical filter (not shown) for lowering noise of a main signal. In this case, for example a single longitudinal mode laser is used as a supervisory light source 118. When the oscillating wavelength of the laser is outside the penetrating wavelength band of the optical filter, the reproduced supervisory signal does not interfere with the supervisory signal which passes through the optically amplifying portion 110, thereby preventing the transmission quality of the supervisory signal from deteriorating.

The supervisory signal is constructed of the content of a defect, a repeater identification number, and so forth. The modulation method of the supervisory signal may be, for example, the ASK envelop detection method, the PSK heterodyne detection method, or the like so that a high S/N ratio and simple modulation circuit can be accomplished.

According to such methods, the supervisory signal is modulated with a low frequency. Thus, the reception S/N ratio of the optically amplifying repeater on the next stage can be improved. Therefore, by satisfactorily lowering the output power of the supervisory signal against the main signal, the effect of the supervisory signal against the main signal can be almost removed.

In the optically amplifying repeater 105, the unit supervising circuit 114 detects on/off of the main signal input, defects of the optically amplifying repeater, and so forth.

In other words, the unit supervising circuit 114 detects (1) an input off state due to defects of a transmitting portion (not shown) of the end station 100a or the transmission line, (2) a decrease of optical output of the optically amplifying portion 110, and (3) a defect of the exciting laser light of the optically amplifying portion 110.

When the unit supervising circuit 114 detects such a defect, the supervisory information processing portion 115 encodes (signalizes) defect information including the content of a defect, the identification number of a repeater which had detected the defect, and so forth. The modulating circuit 116 modulates the supervisory light source 118 with a low frequency and sends the supervisory signal to an inter-station fiber cable.

The optically amplifying repeater 105 in the later stage which has received the supervisory signal reproduces and relays the supervisory signal in the following manner. The identifying portion 113 identifies the defect information from the supervisory signal being received. The supervisory information processing portion 115 and the modulating circuit 116 modulate the supervisory light source 118 with a low frequency and sends the reproduced supervisory signal to the unit on the later stage (the optically amplifying repeater 105, reproducing repeater 120, or end station 100b) through the inter-station fiber cable. When an input off state of the main signal or a defect of an optically amplifying repeater 105 takes place, the repeaters on the later stages of the defective unit successively detect the defect. Thus, supervisory signals may be frequently generated. To prevent this problem, when receiving a supervisory signal from the optically amplifying repeater 105 on the earlier stage, the supervisory information processing portion 115 in the optically amplifying repeater 105 reproduces and relays this supervisory signal with the highest priority.

As shown in FIG. 30, in the reproducing repeater 120 which has received a supervisory signal from the optically amplifying repeater 105, the identifying portion 125 identifies defect information and sends the identified defect information to the SOH processing portion 131. The SOH processing portion 131 writes the defect information received from the identifying portion 125 to the relay region defect evaluation SOH (F1 byte) in the SDH format. The defect information written in the SOH (F1 byte) of the main signal is optically amplified and relayed or reproduced and relayed by the repeaters on the later stages to the end station 100b.

At this point, when a defect takes place in the transmitting portion of the end station 100a in the earlier stage, a defect takes place in an optically amplifying repeater, or a defect takes place over the transmission line, the main signal will be lost. In this case, the SOH processing portion 131 in the reproducing repeater 120 which has received a supervisory signal generates a signal having the same frame construction as the main signal.

Figure 32:
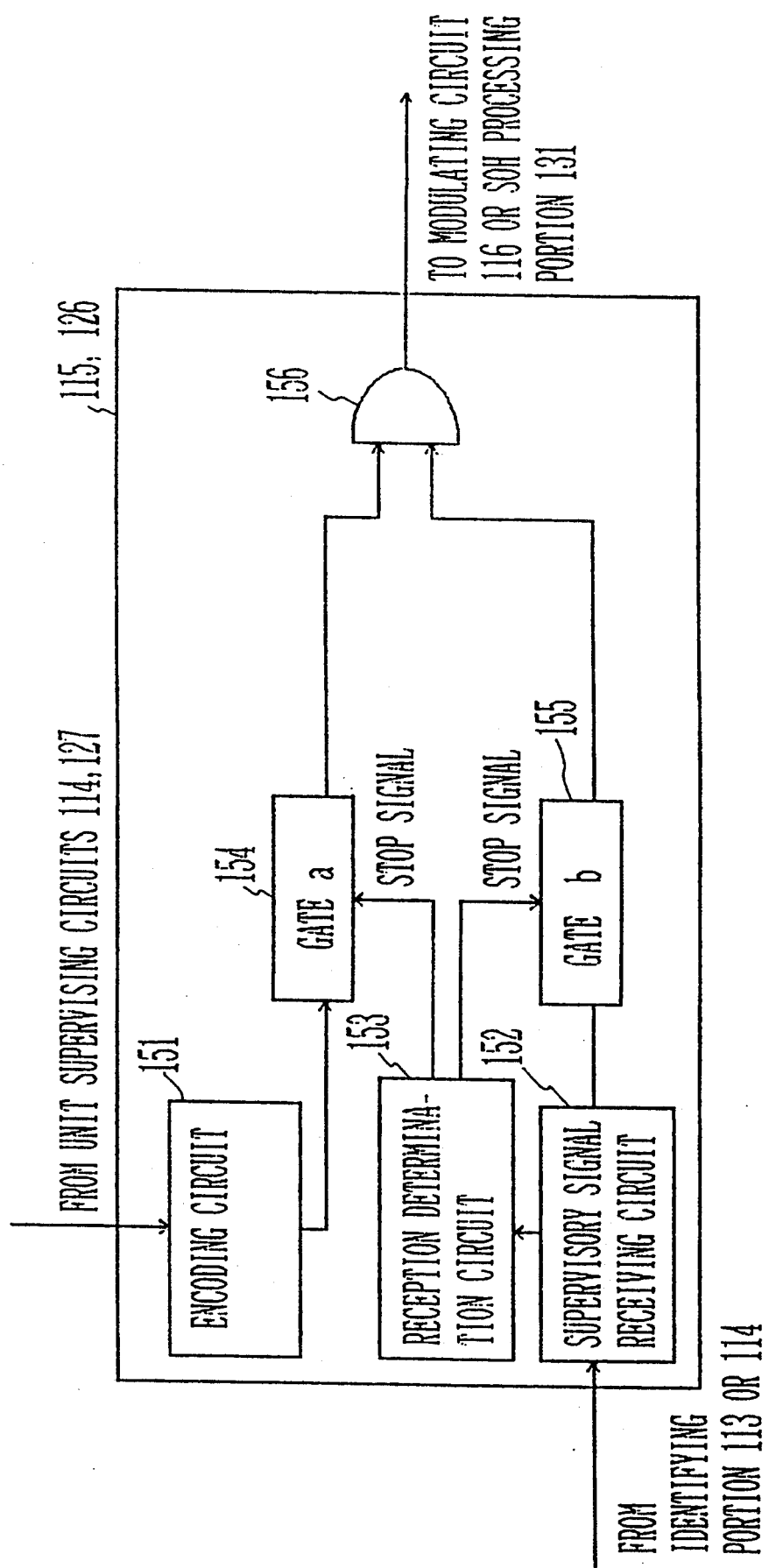
FIG. 32 is a block diagram showing the construction of a supervisory information processing portion as the fourth embodiment of the present invention.

As shown in FIG. 32, in the reproducing repeater 120 and the optically amplifying repeaters 105, the construction of the supervisory information processing portion 115 is the same as that of the supervisory information processing portion 126. In other words, the supervisory information processing portions 115 (126) comprises an encoding circuit 151 which encodes (signalizes) defect information received from the unit supervisory circuit 114 (127), a gate "a" 154 which transmits and stops the supervisory signal generated by the encoding circuit 151, a supervisory signal receiving circuit 152 which receives the defect information from the identifying portion 113 (125), a reception determining circuit 158 which outputs or stops a stop signal to the gate "a" 154 and a gate "b" 155 according to the content of the data received from the supervisory signal receiving circuit 152, and an outputting unit 156 which outputs the signal received from the gate "a" 154 or the gate "b" 155 to the SOH processing portion 131 on the later stage or the modulating circuit 116.

In the supervisory information processing portion, the reception determining circuit 153 receives the supervisory signal several times and determines whether or not all of them match each other. When the reception determining circuit 153 has determined that a supervisory signal had been received from an optically amplifying repeater on the earlier stage, it sends a stop signal to the gate "a" and cancels a stop signal which is sent to the gate "b", thereby causing the unit supervising circuit to stop sending the supervisory signal and a unit on the earlier stage to send a supervisory signal. When the reception determining circuit 153 has determined that it had not received a supervisory signal from an optically amplifying repeater on the earlier stage, it sends the stop signal to the gate "b" so as to stop reproducing and relaying the supervisory signal.

As shown in FIG. 31, when there is no reproducing repeater 120 between a defective unit and the end station 100b, an optically branching portion 141, a receiving portion 146, and an identifying portion 147 are provided so as to receive a supervisory signal.

In the end station 100b, the supervisory control function portion 148 evaluates a defect and performs maintenance operations such as route switching.

When a supervisory signal relaying portion is provided, a supervisory signal bypasses the optically amplifying portion 110 of the optically amplifying repeater. Thus, the level diagram depends on each span. As a result, noise and level variation do not accumulate. In addition, the level diagram is not affected by the level of the main signal, the gains of the optically amplifying repeaters, and the response characteristics. Thus, since the supervisory signal is stably transmitted to the end station, accurate and quick maintenance operations can be performed.

Next, with reference to FIGS. 28 to 31, the case where a supervisory signal relaying portion is not provided in an optically amplifying repeater will be described.

In the above description, a supervisory signal is reproduced and relayed by optically amplifying repeaters 105 on the way to a reproducing repeater 120 on the later stage. However, a supervisory signal may be optically amplified and relayed by an optically amplifying repeater.

In this case, without the optical branching portion 111, the receiving portion 112, and the identifying portion 113, the optically amplifying repeater 105 may be constructed of the supervisory information processing portion 115 and circuits on the later stages which generate a supervisory signal. The reproducing repeater 120 and the end station 100b are constructed as shown in FIGS. 30 and 31, respectively.

In this case, the oscillating wavelength of the light source 118 of the supervisory signal transmitted by the optically amplifying repeater 105 which has detected a defect should be in the band of the penetrating wavelength of an optical filter (not shown) of the optically amplifying portion 110.

Thus, in each optically amplifying repeater 105, circuits such as the optical branching portion 111, the receiving portion 112, and the identifying portion 113 which reproduce and relay the supervisory signal may be omitted, thereby lowering the cost of the repeater system. In addition, the transmission of a supervisory signal is not affected by defects of supervisory signal reproducing and repeating circuits.

When the unit supervising circuits 114 and 127 in the optically amplifying repeater 105 and the reproducing repeater 120 automatically shut down a main signal upon detection of a defect, the S/N ratio of the supervisory signal and the transmission quality of the supervisory signal may be improved.

Figure 33:
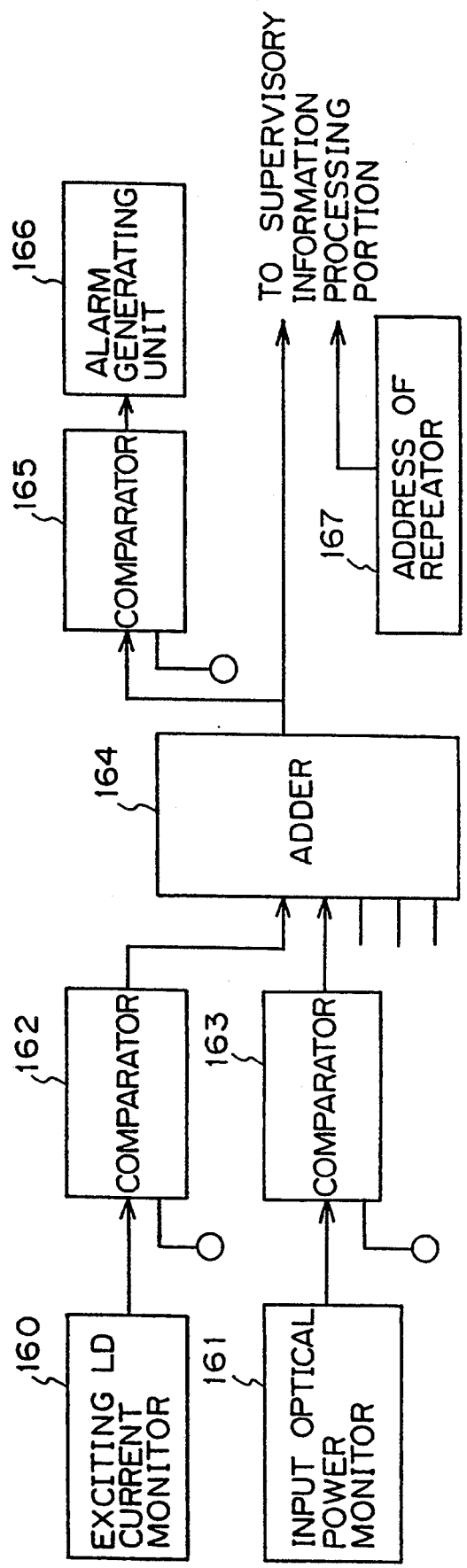
FIG. 33 is a block diagram showing the detailed construction of an unit supervising circuit.

Next, with reference to FIGS. 33 to 36, the major constructional portions of the fourth embodiment will be described. FIG. 33 is a block diagram showing the detailed construction of the unit supervising circuit shown in FIGS. 29 and 30.

In FIG. 33, the unit supervising circuit comprises an exciting LD current monitor 160 which monitors current of an exciting laser diode of the optically amplifying portion 110 or the like, a plurality of monitors such as an input optical power monitor 161 which monitors input optical power, a plurality of comparators such as a comparator 162 which receives the output of the exciting LD current monitor 160 and a comparator 163 which receives the output of the input optical power monitor 161, an adder 164 which adds the outputs of these comparators, a comparator 165 which compares the added result with a predetermined value, an alarm generating unit 166 which generates an alarm corresponding to the output of the comparator 165, and a repeater address register 167 which sends the address of a repeater to the supervisory information processing portion along with the added result of the adder 164.

Figure 34:
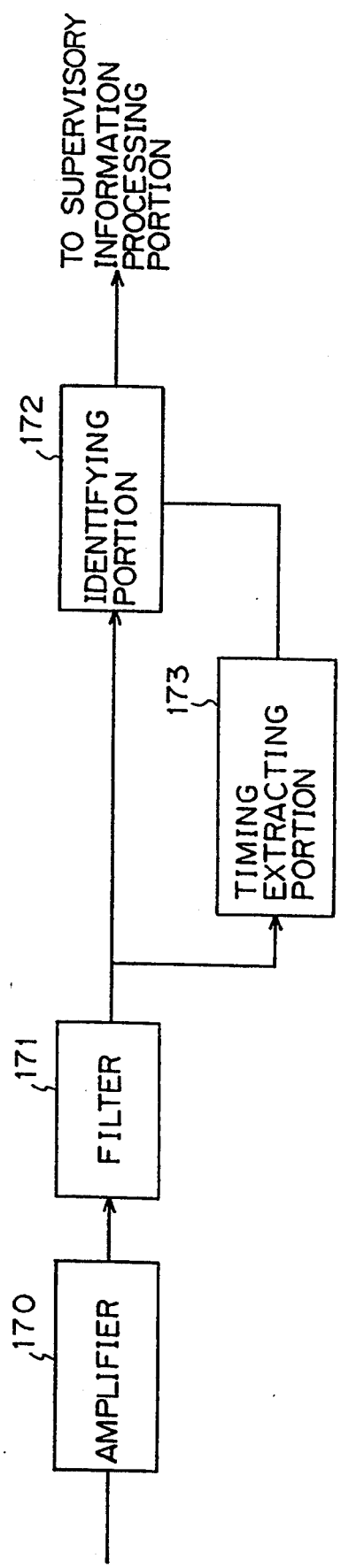
FIG. 34 is a block diagram showing the detailed construction of a identifying portion.

FIG. 34 is a block diagram showing the detailed construction of the identifying portion shown in FIGS. 29, 30, and 31. In FIG. 34, the identifying portion comprises an amplifier 170 which amplifies a signal received from the receiving portion, a filter 171 which passes only the frequency component of for example a supervisory signal, an identifying unit 72 which identifies supervisory information from the output of the filter 171 and sends the resultant information to the supervisory information processing portion and so forth, and a timing extracting portion 173 which extracts a timing with which the identifying unit 172 identifies the supervisory information corresponding to the output of the filter 171.

Figure 35:
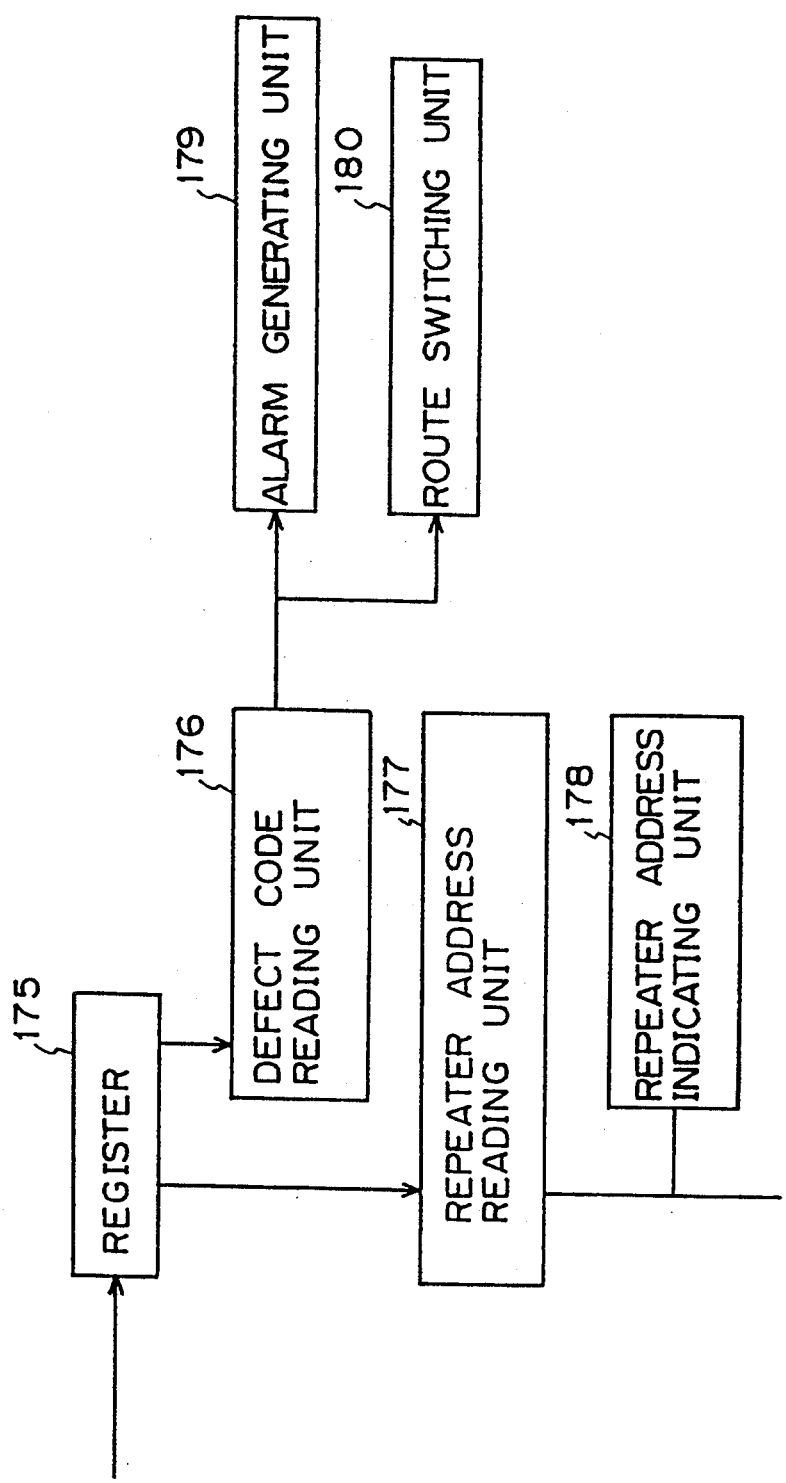
FIG. 35 is e block diagram showing the detailed construction of a supervisory and control function portion.

FIG. 35 is a block diagram showing the detailed construction of a supervisory and control function portion which constructs the end station shown in FIG. 31, the end station being for example a receiving station. In FIG. 35, the supervisory and control function portion comprises a separating portion 143, a register 175 which stores supervisory information received from the identifying portion 147, a defect code reading unit 176 which reads a defect code from the content stored in the register 175, a repeater address reading unit 177 which reads the address of a repeater in which a defect has taken place according to the content stored in the register 175, a repeater address indicating unit 178 which indicates the address of a repeater in which a defect has taken place according to the output of the repeater address reading unit 177, an alarm generating unit 179 which generates an alarm according to the output of the defect code reading unit 176, and a route switching unit 180 which switches a route.

FIG. 36 is a block diagram showing the detailed construction of the reception determining circuit 153 shown in FIG. 32. In this construction, it is assumed that the supervisory signal is received from the earlier stage repeater twice.

In addition, it is assumed that supervisory data such as an identification number of a repeater and defect information is constructed of N bits. The first reception supervisory signal with N bits is stored in a register ①187 through a switch 186. When a counter 185 has counted N bits, the switch 186 is placed in the position of a register ② 188. The second reception supervisory signal with N bits is stored in the register ② 188.

Thereafter, a comparator 189 compares the contents of the register ①187 and the register ②188 on bit-by-bit basis. When all the N bits of the register ①187 accord with those of the register ②188, it is determined that the supervisory signal has been securely received from the repeater on the earlier stage. Thus, a stop signal generator 190 sends a stop signal to the gate "a" 154 so as to cause the encoding circuit 151 to stop the signal. When the contents of the registers 187 and 188 do not match, the stop signal generator 190 sends the stop signal to the gate "b" 155 so as to output the supervisory signal which indicates that a defect has taken place in the repeater. Thus, the repeater stops reproducing and relaying the supervisory signal received from the earlier stage repeater to the later stage repeater.

As described above, according to the present invention, when a burst shaped supervisory and control signal is superimposed on an optical main signal and then the resultant signal is transmitted or relayed, the deterioration of reception sensitivity due to cumulation of successive wave signals superimposed for stabilizing the modulation factor can be lowered. Thus, a long distance transmission through many stages of repeaters can be performed.

Moreover, when a defect takes place in an optically amplifying repeater in the optically amplifying repeater system having optically amplifying repeaters and reproducing repeaters, the defect information can be securely sent to a predetermined end station.

What is claimed is:

1. A supervisory and control signal transmitting system for use in an optically amplifying repeater system, for superimposing a sub signal with a carrier frequency modulated with a supervisory and control signal on an optical main signal modulated according to transmission data and for transmitting the resultant signal, said system comprising:

transmission sub signal superimposing means including sub signal superimposing means for superimposing both said sub signal and a modulation factor stabilizing signal with a frequency different from said carrier frequency on said main signal, for monitoring the output of said sub signal superimposing means and for controlling said sub signal superimposing means so as to stabilize the modulation factor of said sub signal being superimposed; and stabilizing signal erasing means including modulating means for receiving the output of said transmission sub signal superimposing means, for monitoring an output of said modulating means, for extracting the frequency component of said modulation factor stabilizing signal, and for driving said modulating means so as to erase said stabilizing signal from the output of said modulating means, wherein said transmission sub signal superimposing means and said stabilizing signal erasing means are disposed on a transmitter side of said optical main signal.

2. The supervisory and control signal transmitting system as set forth in claim 1, wherein said transmission sub signal superimposing means comprises:

laser light generating means for generating laser light as a main signal which has not yet been modulated according to transmission data;

main signal modulating means for modulating the output of said laser light generating means according to said transmission data;

optical monitoring means for monitoring the output of said sub signal superimposing means and for supplying other than the monitored component to said stabilizing signal erasing means; and superimposing and stabilizing means for stabilizing the modulation factor of said sub signal according to the output of said optical monitoring means, said sub signal superimposing means being adapted to superimpose said sub signal and said modulation factor stabilizing signal on the output of said main signal modulating means under the control of said superimposing and stabilizing means and for supplying the resultant signal to said monitoring means, wherein said stabilizing signal erasing means comprises:

optical monitoring means for monitoring the output of said modulating means; and erasure driving means for supplying a drive signal of said modulating means according to the output of said optical monitoring means.

3. The supervisory and control signal transmitting system as set forth in claim 1, wherein said transmission sub signal superimposing means includes a transmitting means, said transmitting means comprising:

semiconductor laser means for generating said main signal which has not yet been modulated and for superimposing both said sub signal and said modulation factor stabilizing signal on said main signal;

optical intensity modulator means for modulating an output of said semiconductor laser means according to said transmission data;

driving circuit means for supplying a modulation driving signal according to said transmission data to said optical intensity modulator means;

optical branching circuit means for branching part of an output of said optical intensity modulator means and for supplying other than the branched output to said stabilizing signal erasing means;

opto-electric converting circuit means for converting part of optical signal branched by said optical branching circuit means into an electric signal; and sub signal superimposing and bias driving circuit means for superimposing both said sub signal and said modulation factor stabilizing signal on the output of said semiconductor laser means according to an output of said opto-electric converting circuit means and for outputting a bias signal, and wherein said stabilizing signal erasing means forms part of said modulating means and comprises:

optical intensity modulator means for receiving the output of said transmission sub signal superimposing means;

optical branching circuit means for branching part of the output of said optical intensity modulator means and for supplying other than the branched output to a receiver side through a transmission line;

opto-electric converting circuit means for converting part of the optical signal branched by said optical branching circuit means into an electric signal; and stabilizing signal erasure driving circuit means for receiving the output of said opto-electric converting circuit means and for generating a drive signal for erasing said modulation factor stabilizing signal of said optical intensity modulator means.

4. The supervisory and control signal transmitting system as set forth in claim 3,
wherein said sub signal superimposing and bias driving circuit means in said transmitter sub signal superimposing means is adapted to pre-modulate the amplitude of said sub signal modulated with said supervisory and control signal according to said modulation factor stabilizing signal and to compensate the distortion of the waveform of said sub signal, said distortion taking place in the output of said optical intensity modulator means of said stabilizing signal erasing means.

5. The supervisory and control signal transmitting system as set forth in claim 1,
wherein said transmission sub signal superimposing means includes a transmitting means which comprises:
semiconductor laser means for generating said main signal which has not yet been modulated;
first optical intensity modulator means for modulating the output of said semiconductor laser means according to said transmission data;
driving circuit means for supplying a modulation driving signal according to said transmission data to said first optical intensity modulator means;
second optical intensity modulator means for superimposing both said sub signal and said modulation factor stabilizing signal on the output of said first optical intensity modulator means;
optical branching circuit means for monitoring part of an output of said second optical intensity modulator means and for supplying other than a monitored output to said stabilizing signal erasing means;
opto-electric converting circuit means for converting part of optical signal branched by said optical branching circuit means into an electric signal; and
sub signal superimposing and bias driving circuit means for superimposing both said sub signal and said modulation factor stabilizing signal on the output of said second optical intensity modulator means according to the output of said opto-electric converting circuit means and for outputting a bias signal.

6. The supervisory and control signal transmitting system as set forth in claim 1,
wherein said transmission sub signal superimposing means is adapted to monitor an optical main signal which has not yet been modulated according to said transmission data and to control the modulation factor of said sub signal being superimposed so as to prevent the modulation factor of said sub signal from varying due to the mark ratio of code of said main signal.

7. The supervisory and control signal transmitting system as set forth in claim 6,
wherein said transmission sub signal superimposing means includes a transmitting means, said transmitting means comprising:
semiconductor laser means for generating said main signal which has not yet been modulated and for superimposing both said sub signal and said modulation factor stabilizing signal on said main signal;
optical branching circuit means for branching part of the output light of said semiconductor laser means;

opto-electric converting circuit means for converting part of the branched signal branched by said optical branching circuit means into an electric signal; and
sub signal superimposing and bias driving circuit means for superimposing both said sub signal and said modulation factor stabilizing signal on the output of said semiconductor laser means according to the output of said opto-electric converting circuit means and for outputting a bias signal;
optical intensity modulator means for receiving other than the branched optical signal branched by said optical branching circuit means and for supplying the output signal being modulated according to said transmission data to said stabilizing signal erasing means; and
driving circuit means for supplying a modulation driving signal according to said transmission data to said optical intensity modulator means.

8. The supervisory and control signal transmitting system as set forth in claim 6,
wherein said transmission sub signal superimposing means includes a transmitting means, said transmitting means comprising:
semiconductor laser means for generating a main signal which has not yet been modulated;
first optical intensity modulator means for modulating the output of said semiconductor laser means according to said transmission data;
driving circuit means for supplying a modulation drive signal according to said transmission data to said first optical intensity modulator means;
second optical intensity modulator means for superimposing both said sub signal and said modulation factor stabilizing signal on an output of said first optical intensity modulator means and for supplying the resultant signal to said stabilizing signal erasing means;
opto-electric converting circuit means for receiving back power as other than the output supplied to said first optical intensity modulator means and for converting said input optical signal into an electric signal; and
sub signal superimposing and bias driving circuit means for receiving the output of said opto-electric converting circuit means, for superimposing both said sub signal and said modulation factor stabilizing signal on the output of said second optical intensity modulator means according to the output of said opto-electric converting circuit means, and for outputting a bias signal.

9. The supervisory and control signal transmitting system as set forth in claim 1,
wherein said stabilizing signal erasing means comprises:
optical amplifier means for receiving a signal from a transmitting means, said optical amplifier means constructing said transmitting sub signal superimposing means;
optical branching circuit means for branching part of the output of said optical amplifier means and for supplying other than the branched component to a transmission line;
opto-electric converting circuit means for converting an optical signal branched by said optical branching circuit means into an electric signal;
stabilizing signal erasure driving circuit for receiving the output of said opto-electric converting circuit means and for outputting a drive signal for erasing said modulation factor stabilizing signal; and optical amplifier exciting light source means for receiving the output of said stabilizing signal erasure driving circuit and for supplying excited light to said optical amplifier means.

10. A supervisory and control signal transmitting system for use in an optically amplifying repeater system, having a non-regenerating repeater for amplifying an optical signal received from a transmission line, for superimposing a sub signal with a carrier frequency modulated with a supervisory and control signal on said optical signal, and for supplying the resultant signal to a transmission line, said non-regenerating repeater being disposed in said transmission line, said non-regenerating repeater comprising:

a sub signal superimposing means which includes:
superimposing means for superimposing both said sub signal and a modulation factor stabilizing signal with a frequency different from said carrier frequency on an input signal received from said transmission line;
optical monitoring means for monitoring an output of said superimposing means; and
superimposing and stabilizing means for driving said superimposing means so as to stabilize the modulation factor of said sub signal superimposed according to an output of said optical monitoring means, and a stabilizing signal erasing means which includes:
modulating means for receiving other than monitored output monitored by said optical monitoring means from said superimposing means;
optical monitoring means for monitoring an output of said modulating means; and
erasure driving means for extracting a frequency component of said modulation factor stabilizing signal according to an output of said optical monitoring means and for supplying a drive signal for erasing said modulation factor stabilizing signal to said modulating means.

11. The supervisory and control signal transmitting system as set forth in claim 10, wherein
said sub signal superimposing means comprises:
an optical amplifier;
said optical monitoring means comprising:
an optical branching circuit; and
an opto-electric converting circuit;
said superimposing and stabilizing means comprising:
a sub signal superimposing and bias driving circuit; and
an optical amplifier exciting light source, and wherein
said modulating means comprises:
an optical intensity modulator;
said optical monitoring means comprising:
an optical branching circuit; and
an opto-electric converting circuit; and
said erasure driving means comprising:
a stabilizing signal erasure driving circuit.

12. An optically amplifying repeater, connected to a preceding optical repeater through an optical transmission line comprising:
optical amplifier means for amplifying an optical signal received from said transmission line, for superimposing both said sub signal and said modulation factor stabilizing signal, and for removing the frequency component of said modulation factor stabilizing signal used in said preceding repeater;
optical branching circuit means for branching part of the output of said optical amplifier means and for supplying other than the branched output to said transmission line;
opto-electric converting circuit means for converting an optical signal branched by said optical branching circuit means into an electric signal;
sub signal superimposing and stabilizing signal erasing circuit means for superimposing both said sub signal and said modulation factor stabilizing signal on the output of said opto-electric converting circuit means and for outputting a control signal for removing the frequency component of said modulation factor stabilizing signal used in the preceding optical repeater; and
optical amplifier exciting light source means for receiving the output of said sub signal superimposing and stabilizing signal erasing circuit and for supplying excited light to said optical amplifier means.

13. An optically amplifying repeater for use in an optically amplifying repeater system for amplifying an optical signal without conversion into an electric signal and for relaying an amplified signal comprising:
opto-electric converting means for converting to electrical signals a supervisory and control signal light from supervisory signal relaying means of said optically amplifying repeater at an earlier stage;
defect detecting means for detecting a defect which takes place in said optically amplifying repeater;
supervisory signal light generating means for receiving an output of said opto-electric converting means and of said defect detecting means, and for generating an optical signal of the supervisory and control signal to be supplied to a transmission line at a later stage; and
supervisory signal relaying means for relaying said supervisory signal contained in an optical signal received from a preceding optically amplifying repeater at an earlier stage through a transmission line.

14. The optically amplifying repeater as set forth in claim 13, wherein
said opto-electric converting means comprises:
receiving means for receiving light branched by optical branching means;
said defect detecting means comprises:
a unit supervising circuit for detecting a defect in said optically amplifying repeater;
said supervisory signal light generating means comprises:
supervisory information processing means;
identifying means for identifying a supervisory signal received from said optically amplifying repeater at the earlier stage from an output of said receiving means and for supplying said supervisory signal to said supervisory information processing means;
said supervisory information processing means processing supervisory information according to an output of said unit supervising circuit or of said identifying means;
an oscillator for generating a carrier frequency signal for placing said supervisory information;
a modulating circuit for modulating an output of said oscillator according to an output of said supervisory information processing means; and a light source for generating supervisory signal light modulated with an output of said modulating circuit;

said supervisory signal relaying means comprising:

optical branching means for branching part of input signal light received from said transmission line;

optically amplifying means for amplifying other than the branched optical signal branched by said optical branching means; and optical composing means for composing the output of said optically amplifying means and said supervisory signal light received from said light source and for supplying the output for said transmission line.

15. The optically amplifying repeater as set forth in claim 14, wherein said supervisory information processing means comprises:

an encoding circuit for encoding a defect detecting signal received from said unit supervising circuit;

a first gate for outputting a signal received from said encoding circuit;

a supervisory signal receiving circuit for receiving said supervisory signal from said identifying means;

a second gate for outputting a signal received from said supervisory signal receiving circuit;

a reception determining circuit for determining whether or not said optical signal received from said transmission line contains said supervisory signal received from a preceding stage according to the content received from said supervisory signal receiving circuit, for supplying a stop signal to said first gate so as to supply said supervisory signal received from said earlier stage to said transmission line when said optical signal contains said supervisory signal, and for outputting said stop signal to said second gate so as to output a signal received from said encoding circuit when said optical signal does not contain said supervisory signal; and an outputting unit for supplying one of signals received from said first gate and said second gate to said modulating circuit.

16. An optically amplifying repeater for use in an optically amplifying repeater system including reproducing repeaters, for amplifying an optical signal without conversion into an electric signal and for relaying an amplified signal comprising:

opto-electric converting means for converting to electrical signals a supervisory and control signal light from a supervisory signal relaying means of an optically amplifying repeater at an earlier stage;

defect detecting means for detecting a defect which takes place in said optically amplifying repeater;

supervisory signal light generating means for receiving an output of said opto-electric converting means and of said defect detecting means, and for generating an optical signal of supervisory and control signal to be supplied for a transmission line on a later stage; and supervisory signal relaying means for relaying said supervisory signal contained in an optical signal received from a preceding optically amplifying repeater on an earlier stage through a transmission line.

17. A supervisory and control signal transmitting system for use in an optically amplifying repeater system for converting an optical signal received from a preceding optically amplifying repeater into an electric signal, comprising:

supervisory signal placing means for identifying a supervisory signal generated in a preceding optically amplifying repeater and for placing said supervisory signal in a main signal of transmission data, which comprises:

optical branching means for branching part of an optical signal received from a transmission line, receiving means for receiving an optical signal branched by said optical branching means, identifying means for identifying a supervisory signal from an output of said receiving means, supervisory information processing means for processing supervisory information according to an output of said identifying means, section overhead processing means for placing said supervisory signal in said main signal according to an output of said supervisory information processing means, and a unit supervisory circuit for detecting a defect which takes place in said reproducing repeater and for supplying the detected result for said supervising information processing means;

opto-electric converting means for converting an optical signal other than the optical signal branched by said optical branching means into an electric signal and for supplying the electric signal to said section overhead processing means; and electro-optical converting means for converting an output of said section overhead processing means into an optical signal and for supplying the optical signal to a transmission line.

18. The supervisory and control signal transmission system as set forth in claim 17, wherein said supervisory information processing means comprises:

an encoding circuit for encoding a defect detecting signal received from said unit supervising circuit;

a first gate for outputting a signal receiving from said encoding circuit;

a supervisory signal receiving circuit for receiving said supervisory signal from said identifying means;

a second gate for outputting a signal received from said supervisory signal receiving circuit;

a reception determining circuit for determining whether or not said optical signal received from said transmission line contains said supervisory signal received from a preceding stage according to the content received from said supervisory signal receiving circuit, for supplying a stop signal to said first gate so as to supply said supervisory signal received from said earlier stage to said transmission line when said optical signal contains said supervisory signal, and for outputting said stop signal to said second gate so as to output a signal received from said encoding circuit when said optical signal does not contain said supervisory signal; and an outputting unit for supplying one of signals received from said first gate and said second gate to said section overhead processing means.

19. A supervisory and control signal transmitting system for use in an optically amplifying repeater system which includes reproducing repeaters, for converting an optical signal received from a preceding optically amplifying repeater into an electric signal, the system comprising:

supervisory signal placing means for identifying a supervisory signal generated in a preceding optically amplifying repeater and for placing said supervisory signal in a main signal of transmission data, which comprises:

optical branching means for branching part of an optical signal received from a transmission line, receiving means for receiving an optical signal branched by said optical branching means, identifying means for identifying a supervisory signal from an output of said receiving means, supervisory information processing means for processing supervisory information according to an output of said identifying means, section overhead processing means for placing said supervisory signal in said main signal according to an output of said supervisory information processing means, and a unit supervisory circuit for detecting a defect which takes place in said reproducing repeater and for supplying the detected result for said supervising information processing means;

opto-electric converting means for converting an optical signal other than the optical signal branched by said optical branching means into an electric signal and for supplying the electric signal to said section overhead processing means; and electro-optical converting means for converting an output of said section overhead processing means into an optical signal and for supplying the optical signal to a transmission line.

20. An end station for an optical signal transmitting system comprising:

a branching means for branching part of an optical signal received from said transmission line;

a receiving means for receiving the output of said branching means;

an identifying means for identifying a supervisory signal contained in signal light received from said receiving means;

an opto-electric converting means for converting other than the signal branched by said branching means;

a separating means for separating said supervisory signal from the output of said opto-electric converting means; and a supervisory and control function means for performing supervisory and control operation according to said supervisory signal received from said separating means and said identifying means.

21. An end station for an optical signal transmitting system including a reproducing repeater, the system comprising:

a branching means for branching part of an optical signal received from said transmission line;

a receiving means for receiving the output of said branching means;

an identifying means for identifying a supervisory signal contained in signal light received from said receiving means;

an opto-electric converting means for converting other than the signal branched by said branching means;

a separating means for separating said supervisory signal from the output of said opto-electric converting means; and a supervisory and control function means for performing supervisory and control operation according to said supervisory signal received from said separating means and said identifying means.

22. A supervisory and control signal transmission method in an optically amplifying repeater of an optically amplifying repeater system wherein an optical signal transmitted through a transmission line contains transmission data as a main signal and a supervisory and control signal as a sub signal, said method comprising the steps of:

branching a received optical signal to provide a branch signal which includes at least sub signal;

converting the sub signal which is an optical signal to an electrical signal;

identifying the supervisory and control signal in the sub signal which is converted from the optical signal to an electrical signal;

supervising whether or not there are defects in the optically amplifying repeater, thereby a supervisory result;

reproducing defect information based on the supervisory result or the supervisory and control signal;

signalizing the defect information as an electrical signal wherein the supervisory and control signal is assigned higher priority than the supervisory result;

generating an electrical signal for a carrier wave for use for carrying the defect information;

modulating the generated electrical signal according to the signalized defect information;

converting the electrical signal which is modulated according to the signalized defect information to an optical signal;

amplifying the main signal which is an optical signal;

composing an optical signal from the amplified main signal and the optical signal which is modulated according to the signalized defect information; and outputting the composed optical signal.

23. A supervisory and control signal transmission method in an optically amplifying repeater of an optically amplifying repeater system including reproducing repeaters wherein an optical signal transmitted through a transmission line contains transmission data as a main signal and a supervisory and control signal as a sub signal, said method comprising the steps of:

branching a received optical signal to provide a branch signal which includes at least sub signal;

converting the sub signal which is an optical signal to an electrical signal;

identifying the supervisory and control signal in the sub signal which is converted from the optical signal to an electrical signal;

supervising whether or not there are defects in the optically amplifying repeater, thereby a supervisory result reproducing defect information based on the supervisory result or the supervisory and control signal;

signalizing the defect information as an electrical signal wherein the supervisory and control signal is assigned higher priority than the supervisory result;

generating an electrical signal for a carrier wave for use for carrying the defect information;

modulating the generated electrical signal according to the signalized defect information;

converting the electrical signal which is modulated according to the signalized defect information to an optical signal;

amplifying the main signal which is an optical signal;

composing an optical signal from the amplified main signal and the optical signal which is modulated according to the signalized defect information; and outputting the composed optical signal.

24. A supervisory and control signal transmission method in a reproducing repeater of an optically amplifying repeater system wherein an optical signal transmitted through a transmission line contains transmission data as a main signal and a supervisory and control signal as a sub signal, said method comprising the steps of:

branching a received optical signal to provide a branch signal which includes at least sub signal;

converting the sub signal which is an optical signal to an electrical signal;

identifying the supervisory and control signal in the sub signal which is converted from the optical signal to an electrical signal;

supervising whether or not there are defects in the reproducing repeater, thereby a supervisory result;

reproducing defect information based on the supervisory result or the supervisory and control signal;

signalizing the defect information as an electrical signal wherein the supervisory and control signal is assigned higher priority than the supervisory result;

converting the main signal which is an optical signal to an electrical signal;

placing the signalized defect information in the main signal comprising the electrical signal;

converting the main signal comprising the electrical signal and including the defect information to an optical signal; and outputting the optical signal including the defect information in the main signal.

* * * * *